United States Patent
Kim et al.

(10) Patent No.: US 10,511,429 B2
(45) Date of Patent: Dec. 17, 2019

(54) METHOD AND DEVICE FOR TRANSMITTING AND RECEIVING DATA BY USING MULTIPLE CARRIERS IN MOBILE COMMUNICATION SYSTEM

(71) Applicant: Samsung Electronics Co., Ltd, Suwon-si, Gyeonggi-do (KR)

(72) Inventors: Soeng Hun Kim, Suwon-si (KR); Gert Jan Van Lieshout, Middlesex (GB); Sang Bum Kim, Suwon-si (KR); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/968,617

(22) Filed: May 1, 2018

(65) Prior Publication Data

US 2018/0317277 A1    Nov. 1, 2018

Related U.S. Application Data

(63) Continuation of application No. 15/339,876, filed on Oct. 31, 2016, which is a continuation of application
(Continued)

(51) Int. Cl.
*H04M 3/00*    (2006.01)
*H04L 5/00*    (2006.01)
(Continued)

(52) U.S. Cl.
CPC .......... *H04L 5/0098* (2013.01); *H04L 5/0032* (2013.01); *H04W 4/18* (2013.01);
(Continued)

(58) Field of Classification Search
CPC .......... H04W 72/042; H04W 74/0833; H04W 72/0446; H04W 76/27; H04W 56/001; H04W 24/10; H04W 72/04
See application file for complete search history.

(56) References Cited

U.S. PATENT DOCUMENTS

| | | |
|---|---|---|
| 5,898,681 A | 4/1999 | Dutta |
| 8,203,987 B2 | 6/2012 | Ishii et al. |
| (Continued) | | |

FOREIGN PATENT DOCUMENTS

| | | |
|---|---|---|
| CN | 101682896 A | 3/2010 |
| CN | 101841889 A | 9/2010 |
| (Continued) | | |

OTHER PUBLICATIONS

"3rd Generation Partnership Project; Technical Specification Group Radio Access Network Extending 850MHz Study Item Technical Report (Release 9)," 3GPP TR 37.806, V1.1.0, Aug. 2011, 77 pages.
(Continued)

*Primary Examiner* — Khalid W Shaheed

(57) ABSTRACT

To solve the above-mentioned problem, the method for transmitting and receiving a signal by user equipment (UE) through one or more cells, according to one embodiment of the present specification, comprises the steps of: receiving, from a base station, a first message indicating whether one or more cells usable by the UE are enabled; determining which cells to enable or disable on the basis of the first message; and enabling or disabling the selected cells. According to the embodiment of the present specification, by aggregating carriers amongst different base stations, a possibility for the UE to transmit and receive high-speed data through carrier aggregation can increase.

16 Claims, 25 Drawing Sheets

Related U.S. Application Data

No. 14/400,308, filed as application No. PCT/KR2013/003921 on May 6, 2013, now Pat. No. 9,485,765.

(60) Provisional application No. 61/658,617, filed on Jun. 12, 2012, provisional application No. 61/653,026, filed on May 30, 2012, provisional application No. 61/649,910, filed on May 21, 2012, provisional application No. 61/646,888, filed on May 14, 2012, provisional application No. 61/645,591, filed on May 10, 2012, provisional application No. 61/644,645, filed on May 9, 2012.

(51) Int. Cl.

| | | |
|---|---|---|
| *H04W 76/12* | (2018.01) | |
| *H04W 76/15* | (2018.01) | |
| *H04W 52/02* | (2009.01) | |
| *H04W 56/00* | (2009.01) | |
| *H04W 24/02* | (2009.01) | |
| *H04W 4/18* | (2009.01) | |
| *H04W 72/04* | (2009.01) | |
| *H04W 76/28* | (2018.01) | |
| *H04W 48/16* | (2009.01) | |

(52) U.S. Cl.
CPC ........... *H04W 24/02* (2013.01); *H04W 48/16* (2013.01); *H04W 52/0216* (2013.01); *H04W 52/0241* (2013.01); *H04W 56/0005* (2013.01); *H04W 56/0045* (2013.01); *H04W 72/042* (2013.01); *H04W 72/0426* (2013.01); *H04W 72/0453* (2013.01); *H04W 76/12* (2018.02); *H04W 76/15* (2018.02); *H04W 76/28* (2018.02); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/14* (2018.01); *Y02D 70/164* (2018.01); *Y02D 70/23* (2018.01); *Y02D 70/24* (2018.01)

(56) References Cited

U.S. PATENT DOCUMENTS

| | | |
|---|---|---|
| 8,649,288 B2 | 2/2014 | He et al. |
| 9,237,419 B2 | 1/2016 | Jung et al. |
| 2004/0053623 A1 | 3/2004 | Hoff et al. |
| 2006/0085794 A1 | 4/2006 | Yokoyama |
| 2006/0281466 A1 | 12/2006 | Gholmieh et al. |
| 2007/0066329 A1 | 3/2007 | Laroia et al. |
| 2007/0268877 A1 | 11/2007 | Buckley et al. |
| 2008/0032662 A1 | 2/2008 | Tu |
| 2008/0240439 A1 | 10/2008 | Mukherjee et al. |
| 2008/0273610 A1 | 11/2008 | Malladi et al. |
| 2009/0232054 A1 | 9/2009 | Wang et al. |
| 2009/0232118 A1 | 9/2009 | Wang et al. |
| 2009/0238098 A1 | 9/2009 | Cai et al. |
| 2009/0239525 A1 | 9/2009 | Cai et al. |
| 2009/0316586 A1 | 12/2009 | Yi et al. |
| 2010/0093386 A1 | 4/2010 | Damnjanovic et al. |
| 2010/0177831 A1 | 7/2010 | Kim et al. |
| 2010/0195524 A1 | 8/2010 | Iwamura et al. |
| 2010/0265873 A1 | 10/2010 | Yi et al. |
| 2010/0317356 A1 | 12/2010 | Roessel et al. |
| 2011/0002253 A1 | 1/2011 | Cha et al. |
| 2011/0038277 A1 | 2/2011 | Hu et al. |
| 2011/0051609 A1 | 3/2011 | Ishii et al. |
| 2011/0075636 A1 | 3/2011 | Blomgren et al. |
| 2011/0134774 A1 | 6/2011 | Pelletier et al. |
| 2011/0194505 A1 | 8/2011 | Faccin et al. |
| 2011/0195668 A1 | 8/2011 | Lee et al. |
| 2011/0201307 A1 | 8/2011 | Segura |
| 2011/0222451 A1 | 9/2011 | Peisa et al. |
| 2011/0250910 A1 | 10/2011 | Lee et al. |
| 2011/0268087 A1 | 11/2011 | Kwon et al. |
| 2011/0299415 A1 | 12/2011 | He et al. |
| 2012/0051297 A1 | 3/2012 | Lee et al. |
| 2012/0082107 A1 | 4/2012 | Ou et al. |
| 2012/0099545 A1 | 4/2012 | Han et al. |
| 2012/0108199 A1 | 5/2012 | Wang et al. |
| 2012/0176926 A1* | 7/2012 | Jang ............... H04W 24/02 370/252 |
| 2012/0202487 A1 | 8/2012 | Kazmi et al. |
| 2012/0250520 A1 | 10/2012 | Chen et al. |
| 2013/0012186 A1 | 1/2013 | Kim et al. |
| 2013/0044573 A1 | 2/2013 | Kim et al. |
| 2013/0044651 A1* | 2/2013 | Wang ............. H04W 72/0406 370/280 |
| 2013/0058309 A1 | 3/2013 | Kuo |
| 2013/0070682 A1 | 3/2013 | Kim et al. |
| 2013/0114398 A1 | 5/2013 | Wang |
| 2013/0114577 A1 | 5/2013 | Cai et al. |
| 2014/0023032 A1 | 1/2014 | Kim et al. |
| 2014/0242974 A1 | 8/2014 | Lee et al. |
| 2015/0043458 A1 | 2/2015 | Seo et al. |
| 2015/0103771 A1 | 4/2015 | Kim et al. |
| 2017/0195020 A1 | 7/2017 | Ko et al. |

FOREIGN PATENT DOCUMENTS

| | | |
|---|---|---|
| EP | 1973355 A1 | 9/2008 |
| EP | 2265077 A1 | 12/2010 |
| EP | 2849369 A1 | 3/2015 |
| JP | 2011515043 A | 5/2011 |
| KR | 10-2009-0039813 A | 4/2009 |
| KR | 10-2010-0126509 A | 12/2010 |
| KR | 10-2010-0133477 A | 12/2010 |
| KR | 10-2010-0137507 A | 12/2010 |
| KR | 10-20100137531 A | 12/2010 |
| KR | 2011-0093642 A | 8/2011 |
| KR | 10-20110109992 A | 10/2011 |
| KR | 10-2012-0034159 A | 4/2012 |
| RU | 2009120480 A | 12/2010 |
| RU | 2411697 C2 | 2/2011 |
| WO | 9801004 | 1/1998 |
| WO | 9826625 | 8/1998 |
| WO | 2008024788 A2 | 2/2008 |
| WO | 2010111194 A1 | 9/2010 |
| WO | 2010121662 A1 | 10/2010 |
| WO | 2011/038272 A1 | 3/2011 |
| WO | 2011/100492 A1 | 8/2011 |
| WO | 2011093666 A2 | 8/2011 |
| WO | 2011099725 A2 | 8/2011 |
| WO | 2011157292 A1 | 12/2011 |
| WO | 2012/008691 A2 | 1/2012 |
| WO | 2012108811 A1 | 8/2012 |
| WO | 2012141483 A2 | 10/2012 |
| WO | 2013051836 A1 | 4/2013 |
| WO | 2013051912 A2 | 4/2013 |
| WO | 2013065995 A1 | 5/2013 |

OTHER PUBLICATIONS

"Multiple Frequency Band Indicators per Cell," 3GPP TSG-RAN WG2 #75, Tdoc R2-114299, Ericsson and ST Ericsson, Athens, Greece, Aug. 22-26, 2011, 5 pages.

"The MDT Applicability of EPLMN," 3GPP TSG-WG2 Meeting #75, R2-114011, Huawei and HiSilicon, Athens, Greece, Aug. 22-26, 2011, 16 pages.

Foreign Communication From a Related Counterpart Application, Chinese Application No. 201280040843.3, Text of the First Office Action dated Dec. 8, 2016, 10 pages.

Foreign Communication From a Related Counterpart Application, Chinese Application No. 201380036294.7, Second Office Action dated Jan. 6, 2017, 10 pages.

Foreign Communication From a Related Counterpart Application, Chinese Application No. 201380036294.7, Third Office Action dated Feb. 4, 2017, 7 pages.

(56) References Cited

OTHER PUBLICATIONS

Foreign Communication From a Related Counterpart Application, Russian Application No. 2014127861, Decision on Grant dated Nov. 28, 2016, 8 pages.
"3rd Generation Partnership Project; Technical Specification Group Radio Access Network; Evolved Universal Terrestrial Radio Access (E-UTRA); User Equipment (UE) radio transmission and reception (Release 10)"; 3GPP TS 36.101 V10.3.0; Jun. 2011; 237 pages.
Foreign Communication from Related Counterpart Application; European Patent Application No. 12826371.8; Communication Pursuant to Article 94(3) EPC dated Apr. 13, 2018; 7 pages.
International Search Report dated Aug. 27, 2013 in connection with International Patent Application No. PCT/KR2012/003921, 5 pages.
Written Opinion of International Searching Authority dated Aug. 27, 2013 in connection with International Patent Application No. PCT/KR2012/00321, 5 pages.
3GPP TS 36.321 V10.5.0, "3rd Generation Partnership Project; Technical Specification Group Radio Access Network; Evolved Universal Terrestrial Radio Access (E-UTRA); Medium Access Control (MAC) Protocol Specification (Release 10)", Mar. 2012, 54 pages.
Mediatrak, "MAC CE for SCell Activation Deactivation", R2-105443, 3GPP TSG-RAN WG2 Meeting #71bis, Xi'an, China, Oct. 11-15, 2010, 4 pages.
HTC, "Scells Re-Activation Issues", 3GPP TSG-RAN WG2 Meeting #73, Taipei, Taiwan, Feb. 21-25, 2011, 5 pages.
ZTE, "Discussion on Activation and Deactivation MAC CE", 3GPP TSG-RAN WG2 Meeting #72, R2-106330, Jacksonville, USA, Nov. 15-19, 2010, 4 pages.
Acer Inc., "Correction to SCell Deactivation", R2-121411, 3GPP TSG-RAN WG2 Meeting #77bis, Jeju, Korea, Mar. 26-30, 2012, 2 pages.
Extended European Search Report dated Jan. 19, 2016 in connection with European Application No. 13788412.8, 10 pages.
Huawei et al, "Signalling for the TA Group Management", R2-115827, 3GPP TSG-RAN WG2 Meeting #76, Nov. 14-18, 2011, San Francisco, CA, 4 pages.
3GPP TR 36.805 V9.0.0, "3rd Generation Partnership Project; Technical Specification Group Radio Access Network; Study on Minimization of Drive-Tests in Next Generation Networks; (Release 9)", Dec. 2009, 24 pages.
WayBack Machine, "23.1 RRC Connection Establishment", www.lte-bullets.com, Aug. 12, 2011, retrieved from Internet on Mar. 9, 2017, Long Term Evolution (LTE), 4 pages.
3GPP TS 37.320 V10.4.0, "3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10)", Dec. 2011, 18 pages.
Intel Corporation, "Support for UE Assistance Information for eDDA", 3GPP TSG RAN WG2 Meeting #77bis, R2-121746, Mar. 26-30, 2012, Jeju, Korea, 4 pages.
Examination Report No. 4 dated Mar. 10, 2017 in connection with Australian Application No. 2013208385, 7 pages.
Decision on Grant dated Jan. 20, 2017 in connection with Russian Application No. 2014106662, 17 pages.
Office Action dated Mar. 27, 2017 in connection with Japanese Application No. 2015-517186, 13 pages.
Office Action dated Mar. 24, 2017 in connection with U.S. Appl. No. 15/243,280, 26 pages.
State Intellectual Property Office of the P.R.C., "Text of the First Office Action," Chinese Application No. 2013800240263, dated Sep. 5, 2017, 36 pages.
European Patent Office, "Communication pursuant to Article 94(3) EPC," Application No. EP13736123.4, dated Apr. 1, 2019, 4 pages.
Korean Intellectual Patent Office, "Office Action," Application No. KR 10-2013-0050776, dated Mar. 6, 2019, 9 pages.
Korean Intellectual Patent Office, "Office Action," Application No. KR 10-2014-7035538, dated May 29, 2019, 8 pages.
Korean Intellectual Patent Office, "Office Action," Application No. KR 10-2013-0051929, dated May 1, 2019, 14 pages.
3GPP TS 36.331 V10.5.0 (Mar. 2012), Technical Specification, 3rd Generation Partnership Project; Technical Specification Group Radio Access Network; Evolved Universal Terrestrial Radio Access (E-UTRA); Radio Resource Control (RRC); Protocol specification (Release 10), Mar. 2012, 302 pages.
Samsung, "On the reporting the failed RRC connection establishment," R2-121272, 3GPP TSG RAN WG2 #77bis, Mar. 26-30, 2012, Jeju Island, Korea, 4 pages.
Office Action dated Sep. 7, 2018 in connection with Korean Patent Application No. 10-2014-7012797, 9 pages.
Communication from a foreign patent office in a counterpart foreign application, IP Australia, "Examination report No. 1 for standard patent application," Application No. AU 2017203059, dated Jun. 5, 2018, 8 pages.
Communication from a foreign patent office in a counterpart foreign application, Canadian Intellectual Property Office, Office Action in connection with Application No. CN 2,845,779, dated Jun. 7, 2018, 4 pages.
Communication from a foreign patent office in a counterpart foreign application, European Patent Office, "Communiation pursuant to Article 94(3) EPC," Application No. EP 12839782.5, dated Jul. 24, 2018, 6 pages.
Ericsson, et al., "Multiple frequency band indicators per cell," R2-114301, 3GPP TSG-RAN2 Meeting #75, Athens, Greece, Aug. 22-26, 2011, 8 pages.
Samsung, "Discussion on CQI/SRS transmission during DRX," Tdoc R2-114180, 3GPP TSG-RAN2 #75 meeting, Athens, Greece, Aug. 22-26, 2011, 5 pages.
"3rd Generation Partnership Project; Technical Specification Group Radio Access Network; Evolved Universal Terrestrial Radio Access (E-UTRA); Radio Resource Control (RRC); Protocol specification (Release 10)", 3GGP TS 36.331 V10.4.0 (Dec. 2011), 296 pages.
Office Action dated Nov. 27, 2018 in connection with India Patent Application No. 2519/KOLNP/2014, 5 pages.
Office Action dated Jan. 3, 2019 in connection with Korean Patent Application No. 10-2013-0002595, 11 pages.
InterDigital Communications, "Handling of SCell Activation/Deactivation RF Retuning Interruptions", 3GPP TSG RAN WG2 #78, May 21-26, 2012, 13 pages, R2-122289.
Renesas Mobile Europe Ltd., "Considerations on retuning interruptions", 3GPP TSG-RAN WG4 Meeting #63, May 21-25, 2012, 5 pages, R4-123056.
Ericsson, ST-Ericsson, "Accessibility measurements for MDT", 3GPP TSG-RAN WG2 #76, Oct. 14-18, 2011, 2 pages.
Office Action dated May 31, 2017 in connection with Chinese Patent Application No. 201380010349.7.
Office Action dated Aug. 22, 2017 in connection with Chinese Patent Application No. 201380038905.1.
Office Action dated Jun. 5, 2017 in connection with Japanese Patent Application No. 2014-551202.
Canadian Intellectual Property Office, Examination report for Application No. CA 2,859,499, dated Jun. 6, 2019, 4 pages.
European Patent Office, "European Search Report," Application No. EP19165270.0, dated Jul. 3, 2019, 10 pages.
European Patent Office, "European Search Report," Application No. EP19184016.4, dated Oct. 7, 2019, 10 pages.
Intellectual Property India, Examination report under sections 12 & 13 of the Patents Act, 1970 and the Patents Rules, 2003, Application No. IN 3851/KOLNP/2013, dated Sep. 18, 2019, 8 pages.
Korean Intellectual Property Office, "Office Action," Application No. KR 10-2012-00113330, dated Sep. 1, 2019, 9 pages.
Korean Intellectual Property Office, "Decision of Patent," Application No. KR 10-2013-0002595, dated Sep. 5, 2019, 7 pages.
Catt, et al., "Frame and SFN timing in CA," R2-103521, 3GPP TSG RAN WG2 Meeting #70bis, Stockholm, Sweden, Jun. 28-Jul. 2, 2010, 2 pages.
Ericsson, et al., "CSI and SRS reporting at unexpected DRX state change," Tdoc R2-114033, 3GPP TSG-RAN WG2 #75, Athens, Greece, Aug. 22-26, 2011, 5 pages.

(56) References Cited

OTHER PUBLICATIONS

Ericsson, et al., "Accessibility measurements for MDT," Tdoc R2-116148, 3GPP TSG-RAN WG2 #76, San Francisco, USA, Oct. 14-18, 2011, 2 pages.
Huawei, et al., "Consideration on coverage optimization," R2-115885, 3GPP TSG-RAN WG2 Meeting #76, San Francisco, USA, Nov. 14-18, 2011, 2 pages.
Nokia et al., "Clarification on CQI/SRS reporting during DRX," R2-114021, 3GPP TSG-RAN WG2 Meeting #75, Athens, Greece, Aug. 22-26, 2011, 3 pages.

* cited by examiner

METHOD AND DEVICE FOR TRANSMITTING AND RECEIVING DATA BY USING MULTIPLE CARRIERS IN MOBILE COMMUNICATION SYSTEM

CROSS REFERENCED TO RELATED APPLICATIONS AND CLAIM OF PRIORITY

This application is a continuation of application Ser. No. 15/339,876, filed Oct. 31, 2016, which is a continuation of U.S. patent application Ser. No. 14/400,308, which is the National Stage of International Application No. PCT/KR2013/003921, filed May 6, 2013, now U.S. Pat. No. 9,485,765, which claims the benefit of Provisional Application No. 61/644,645, filed May 9, 2012, Provisional Application No. 61/645,591, filed May 10, 2012, Provisional Application No. 61/646,888, filed May 14, 2012, Provisional Application No. 61/649,910, filed May 21, 2012, Provisional Application No. 61/653,026, filed May 30, 2012, and Provisional Application No. 61/658,617, filed Jun. 12, 2012, the disclosures of which are incorporated herein by reference into the present disclosure as if fully set forth herein.

BACKGROUND

1. Field

The present invention relates to a multicarrier-based data transmission/reception method and apparatus for use in a mobile communication system.

2. Description of Related Art

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution (LTE) system, as one of the next-generation mobile communication systems, is underway in the $3^{rd}$ Generation Partnership Project (3GPP). LTE is a technology for realizing high-speed packet-based communications with the data rate of up to 100 Mbps, which is higher than the currently available data rate, and its standardization is almost complete.

In line with the completion of the LTE standardization, an LTE-Advanced (LTE-A) system is now under discussion, which improves a transfer rate by combining the LTE communication system with several new technologies. One of such technologies is Carrier Aggregation. The Carrier Aggregation is a technology allowing a terminal to use multiple downlink carriers and multiple uplink carriers unlike the conventional technology of using one downlink carrier and one uplink carrier for data communication.

Currently, the LTE-A is featured with the intra-eNB carrier aggregation only. This restricts applicability of the carrier aggregation function so as to a problem of failing aggregation of macro and pico or femto cells in a scenario where a plurality of pico or femto cells and a macro cell operate in an overlapped manner.

SUMMARY

The present invention has been conceived to solve the above problem and aims to provide an inter-eNB carrier aggregation method and apparatus.

In accordance with an aspect of the present invention, a communication method of a terminal which transmits/receives signals through one or more cells includes receiving a first message for instructing activation/deactivation of the cells available for the terminal from a base station, selecting a cell to be activated or deactivated based on the first message, and activating or deactivating the selected cell.

In accordance with another aspect of the present invention, a communication method of a base station which transmits/receives signals through one or more cells includes selecting a cell to be activated or deactivated for signal communication with the terminal and transmitting a first message notifying whether to activate one or more cells for use by the terminal based on information determined, wherein the terminal determines the cells to be activated or deactivated based on the first message and activates or deactivates the determined cells.

In accordance with another aspect of the present invention, a terminal which transmits/receives signals through one or more cells includes a transceiver which transmits and receives signals to and from a base station and a controller which controls the transceiver to receive a first message for instructing activation/deactivation of the cells available for the terminal from a base station, selects a cell to be activated or deactivated based on the first message, and activates or deactivates the selected cell.

In accordance with still another aspect of the present invention, a base station which transits/receives signals through one or more cells includes a transceiver which transmits and receives signals to and from a terminal and a controller which controls the transceiver, selects a cell to be activated or deactivated for signal communication with the terminal, and controls transmitting a first message notifying whether to activate one or more cells for use by the terminal based on information determined, wherein the terminal determines the cells to be activated or deactivated based on the first message and activates or deactivates the determined cells.

The data transmission method and apparatus of the present invention is advantageous in that a terminal is capable of increasing the probability of fast data transmission/reception through carrier aggregation.

DETAILED DESCRIPTION

Figure 1:
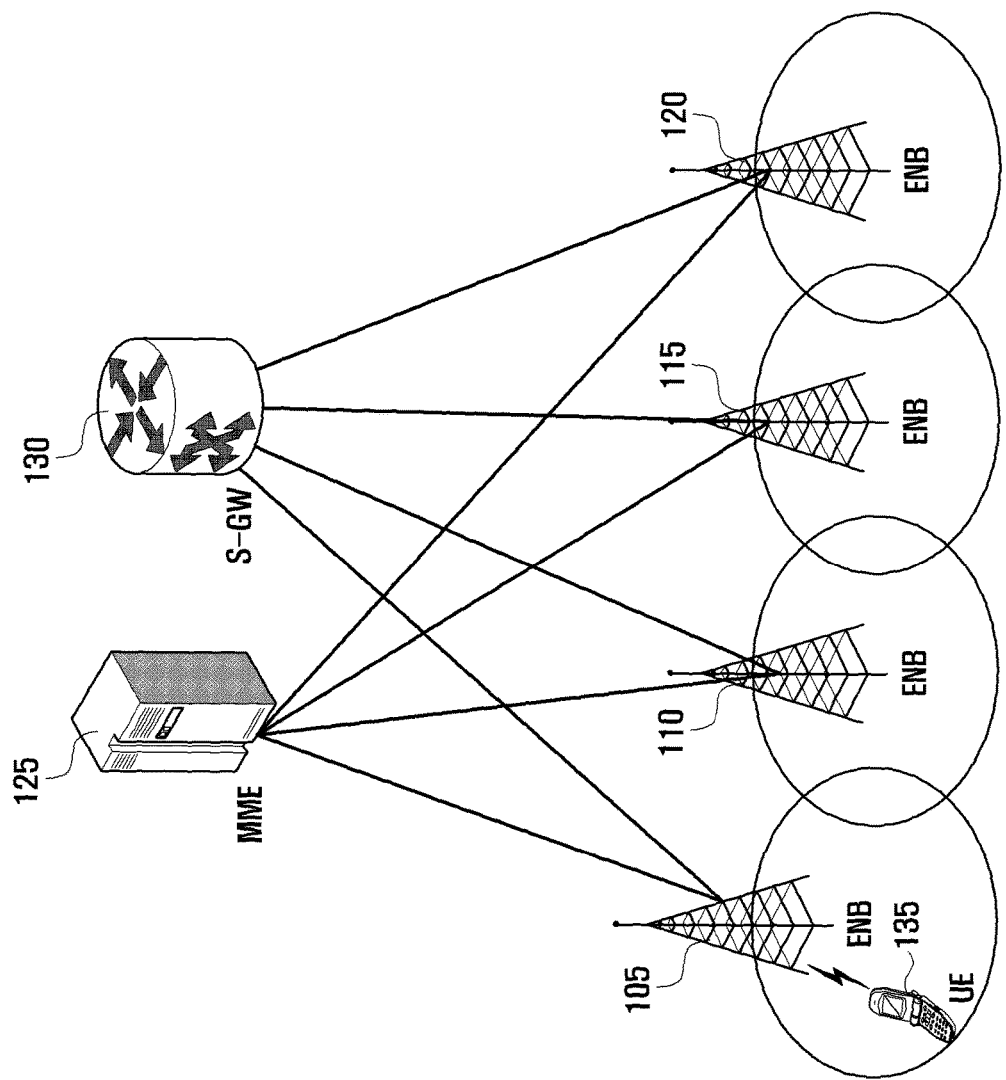
FIG. 1 is a diagram illustrating the architecture of an LTE system according to an embodiment of the present invention.

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

Detailed description of well-known functions and structures incorporated herein may be omitted to avoid obscuring the subject matter of the present invention. Exemplary embodiments of the present invention are described with reference to the accompanying drawings in detail. Prior to the description of the present invention, the LTE system and carrier aggregation are explained briefly.

FIG. 1 is a diagram illustrating the architecture of an LTE system according to an embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 correspond to the legacy node Bs of the UMTS system. The eNBs allow the UE 135 to establish a radio channel and are responsible for complicated functions as compared to the legacy node B. In the LTE system, all the user traffic including real time services such as Voice over Internet Protocol (VoIP) are provided through a shared channel and thus there is a need of a device to schedule data based on the state information such as buffer states, power headroom states, and channel states of the UEs; and the eNBs 110, 115, and 120 are responsible for this. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for mobility management of UEs and various control functions and may be connected to a plurality of eNBs.

Figure 2:
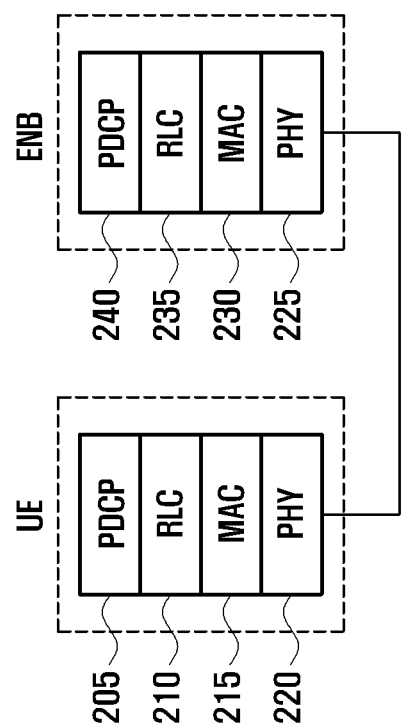
FIG. 2 is a diagram illustrating a protocol stack of the LTE system according to an embodiment of the present invention.

FIG. 2 is a diagram illustrating a protocol stack of the LTE system according to an embodiment of the present invention.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
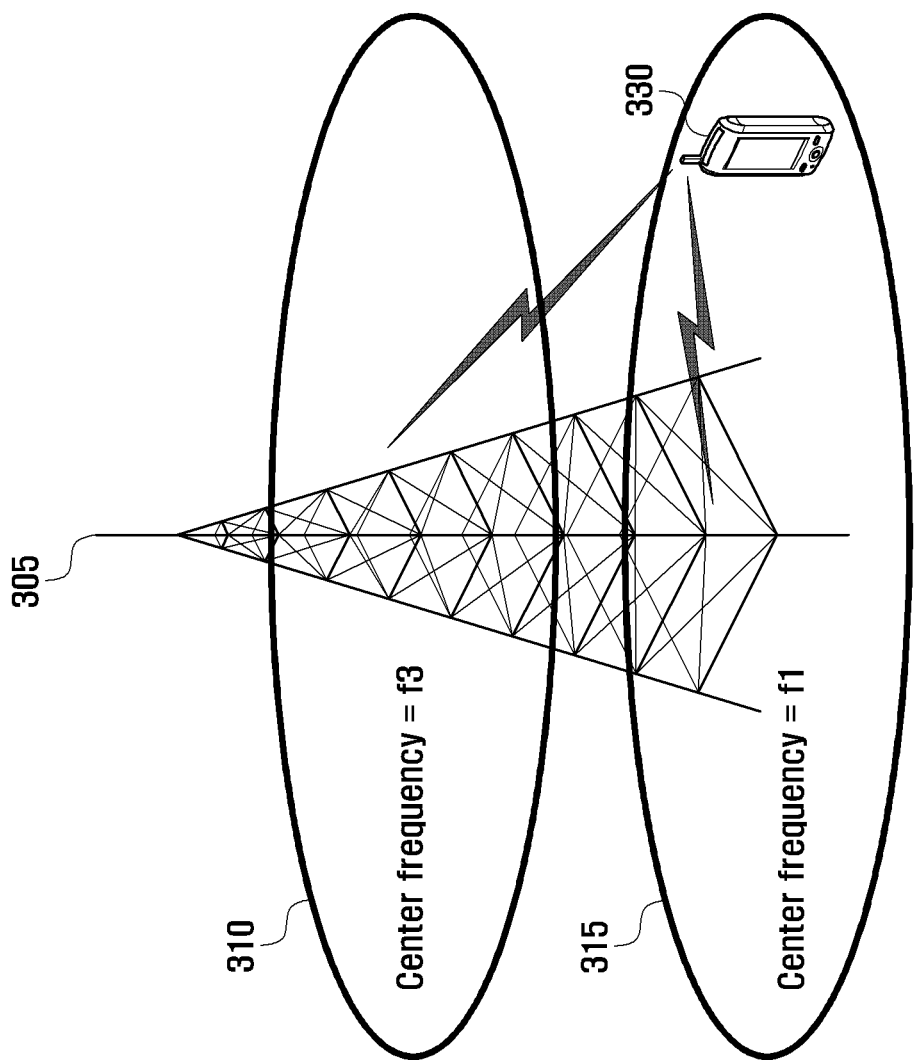
FIG. 3 is a diagram illustrating the normal carrier aggregation.

FIG. 3 is a diagram illustrating the concept of intra-eNB carrier aggregation.

Referring to FIG. 3, an eNB transmits and receives signals through multiple carriers across a plurality of frequency bands. For example, the eNB 305 can be configured to use the carrier 315 with center frequency f1 and the carrier 310 with center frequency f3. If carrier aggregation is not supported, the UE 330 has to transmit/receive data using one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE 330. The technique of aggregating the downlink and uplink carriers respectively for transmission and reception at one eNB is referred to as intra-eNB carrier aggregation. In any case, however, there may be a need of aggregating the downlink/uplink carriers of different eNBs.

Figure 4:
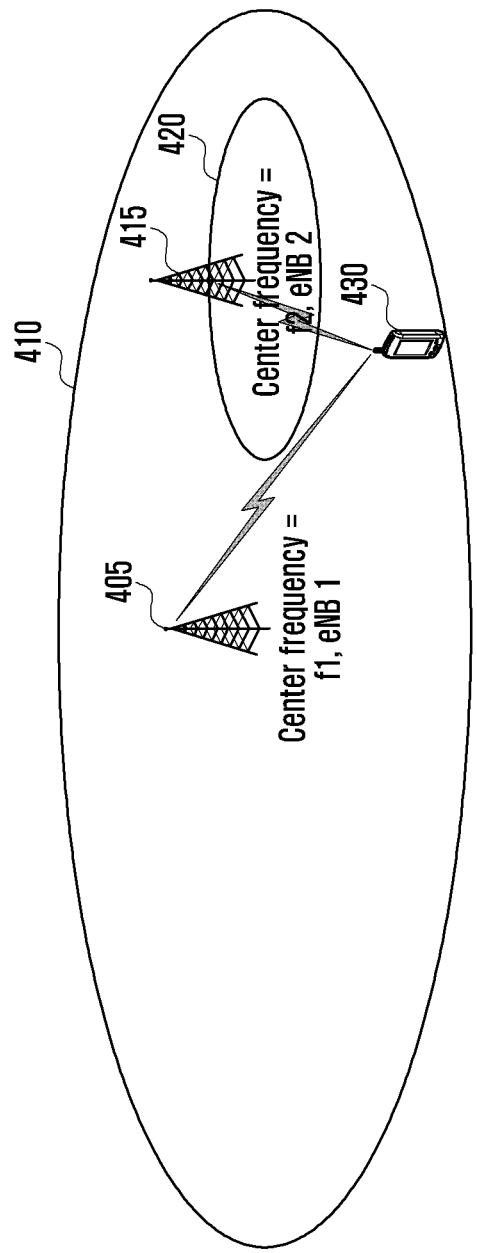
FIG. 4 is a diagram illustrating the inter-eNB carrier aggregation.

FIG. 4 is a diagram illustrating the inter-eNB carrier aggregation according to an embodiment of the present invention.

Referring to FIG. 4, the eNB 1 405 uses the carrier 410 with center frequency f1 for transmission/reception, and the eNB 2 415 uses the carrier 420 with center frequency f2 for transmission/reception. If the downlink carrier 410 with the center frequency f1 and the downlink carrier 420 with the center frequency f2 are aggregated, this means that carriers transmitted by more than one eNB are aggregated for one UE. This is referred to as inter-eNB Carrier Aggregation (CA) in the present invention.

The terms used frequently in the present invention are described hereinafter.

Assuming that a cell is configured with one downlink carrier and one uplink carrier in the conventional concept, the carrier aggregation can be understood as if the UE communicates data via multiple cells. With the use of carrier aggregation, the peak data rate increases in proportion to the number of aggregated carriers.

In the following description, if a UE receives data through a certain downlink carrier or transmits data through a certain uplink carrier, this means to receive or transmit data through control and data channels provided in cells corresponding to center frequencies and frequency bands characterizing the carriers. In the present Invention, carrier aggregation may be expressed as configuring a plurality of serving cells with the use of terms such as primary cell (PCell), secondary cell (SCell), and activated serving cell. These terms are used as they are in the LTE mobile communication system and specified in TS36.331 and TS36.321 (December, 2011).

In the present invention, the serving cells controlled by the same eNB are defined as a set of serving cells. The set may is classified into one of a primary set and a non-primary set. The primary set is the set of serving cells controlled by the eNB controlling the PCell (primary eNB), and the non-primary set is the set of serving cells controlled by the eNB not controlling the PCell (non-primary eNB). The eNB may notifies the UE whether a serving cell belongs to the primary set or non-primary set in the process of configuring the corresponding serving cell. One UE can be configured with one primary set and one or more non-primary set.

In the following description, the terms 'primary set' and 'non-primary set' may be substituted by other terms to help understanding. For example, the terms 'primary set,' 'secondary set,' 'primary carrier group,' and 'secondary carrier group' may be used. Even in such a case, however, it should be notice that although the terms are different but used in the same meaning.

Figure 5:
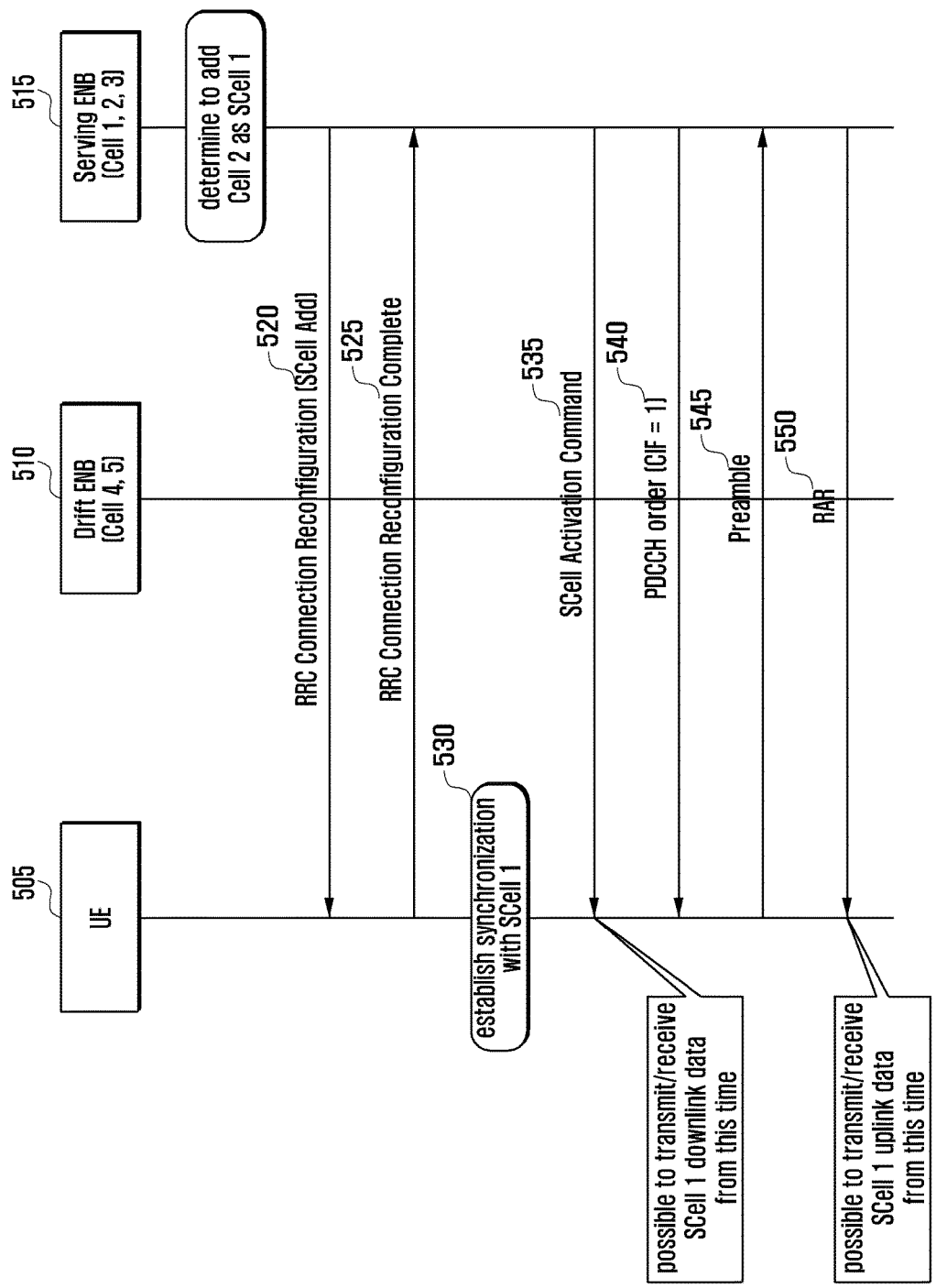
FIG. 5 is a signal flow diagram illustrating the operations of the UE and the eNB for configuring a SCell belonging to the primary set.

FIG. 5 is a signal flow diagram illustrating the operations of the UE and the eNB for configuring a SCell belonging to the primary set according to an embodiment of the present invention.

Referring to FIG. 5, in the mobile communication system made up of the UE 505, the eNB 1 515, and the eNB 2 510, the cell 1 to cell 3 are controlled by the eNB 1 515; and the fourth and fifth cells are control by the eNB 2 510. Suppose that the PCell of the UE is the cell 1 and the eNB 1 515 configures the Cell 2 as an additional SCell to the UE 505. In the following description, the eNB 515 controlling the PCell, i.e. the primary set, is referred to as serving eNB. The eNB 510 which is not the serving eNB 515 and controls the serving cell of the UE is referred to as drift eNB. That is, the eNB 515 controlling the serving cells of the primary set is the serving eNB 515, and the eNB 510 controlling the serving cells of the non-primary set is the drift eNB 510. The serving eNB 515 and the drift eNB 510 may be referred to as the primary eNB 515 and non-primary eNB 510, respectively.

The serving eNB 515 sends the UE a control message called RRC Connection Reconfiguration including the information on the SCell to be added newly to the UE at step 520. The SCells to be added newly are managed by the serving eNB 515 directly and information thereon is included in the control message as shown in table 1.

TABLE 1

| Name | Description |
| --- | --- |
| sCellIndex-r10 | Serving cell identifier of an integer with a predetermined size. Used in updating information on the corresponding serving cell in the future. |
| cellIdentification-r10 | Information for use in identifying the serving cell physically and composed of downlink center frequency and Physical Cell ID (PCI) |
| radioResourceConfigCommonSCell-r10 | Information on radio resource of service cell, e.g. downlink bandwidth, downlink Hybrid ARQ (HARQ) feedback channel configuration information, uplink center frequency information uplink bandwidth information. |
| radioResourceConfigDedicatedSCell-r10 | Information on UE-specific resource allocated in the serving cell, e.g. channel quality measurement reference signal structure information and inter-carrier scheduling configuration information. |
| Timing Advance Group (TAG) information | Information indicating TAG to which UE belongs. For example, it may be composed of TAG id and Timing Advance (TA) timer. If the UE belongs to P-TAG, this information may not be signaled. |

The Timing Advance Group (TAG) is a set of the serving cells sharing the same uplink transmission timing. A TAG is classified into one of Primary TAG (P-TAG) and Secondary TAG (S-TAG). The P-TAG includes the PCell, and S-TAG includes SCells without PCell). If a certain serving cell belongs to a certain TAG, this means that the uplink transmission timing of the serving cell is identical with those of the other serving cells belonging to the TAG and whether the uplink synchronization is acquired is determined by means of the Timing Advance (TA) timer of the TAG. The uplink transmission timing of a certain TAG is set through a random access process in a serving cell belonging to the TAG and maintained with the receipt of TA command. The UE starts or restart the TA timer of the corresponding TAG whenever the TA command for the corresponding TAG is received. If the TA timer expires, the UE determines that the uplink transmission synchronization of the corresponding TAG has broken and thus suspends uplink transmission until the next random access occurs.

At step 525, the UE 505 transmits a response message in reply to the control message based on the message received at step 520.

The UE 505 establishes forward/downlink synchronization with the Cell 2, i.e. serving cell 1, at step 530. The forward/downlink is of transmitting from the eNB to the UE, and the reverse/downlink is of transmitting from the UE to the eNB. In the present invention, the terms are used interchangeably. If the downlink synchronization is established in a certain cell, this means that the synchronization channel of the cell is acquired so as to check the downlink frame boundary.

The serving eNB 515 may send the UE 505 a command to activate the SCell 1 at a certain time when determined that the UE has completed the configuration of the SCell 1 at step 535. The SCell 1 activation command may be Activate/Deactivate MAC Control Element (A/D MAC CE) as a MAC layer control command. The control command is structured in the form of a bitmap of which the first bit corresponds to the SCell 1, the second bit to SCell 2, and the $n^{th}$ bit to SCell n. The bitmap may be the size of 1 byte. In this case, 7 indices, i.e. from 1 to 7, are used in such a way of mapping the second Least Significant Bit (LSB) to the SCell 1, the third LSB to SCell 2, and the last LSB or the Most Significant Bit (MSB) to SCell 7, without use of the first LSB.

The UE 505 starts monitoring the physical control channel (carrying Physical Downlink Control Channel (PDCCH) and uplink/downlink transmission resource allocation information) of the SCell after the elapse of a predetermined period from the receipt of the SCell 1 activation command at step 535. If the SCell has been acquired synchronization and belonged to a TAG already, the downlink/uplink transmission starts since then. That is, if the downlink transmission resource allocation information is received on the PDCCH, the UE receives downlink data but ignores the uplink transmission resource information although it has bene received. If the SCell belongs to a non-synchronized TAG, the UE waits for the receipt of 'random access command' on PDCCH in a SCell belonging to the TAG. The random access command is a value of a predetermined field of the uplink transmission resource allocation information to instruct the UE 505 to transmit a preamble in a serving cell. The Carrier Indicator Field of the random access command may carry the identifier of the serving cell for preamble transmission.

The UE 505 receives a random access command instructing to transmit a random access preamble in the serving cell 1.

The UE 505 monitors PDCCH of the PCell to receive Random Access Response (RAR) in reply to the preamble after transmitting the preamble through the SCell 1 at step 545. The RAR may include TA command and other control information. If the preamble is transmitted by the serving eNB 515, it is likely to be efficient to send the response in replay to the preamble through the PCell in various aspects. For example, since the RAR is received only through the PCell, it is possible to reduce the PDCCH monitoring load of the UE. Accordingly, the UE 505 monitors the PDCCH of the PCell to receiving RAR at step 550.

If a valid response message is received in reply to the preamble, the UE 505 assumes that it is possible to transmit uplink signal transmission after the elapse of a predetermined period from that time point. For example, if the valid RAR is received at the subframe n, it is determined that the uplink transmission is possible from the subframe (n+m).

Figure 6:
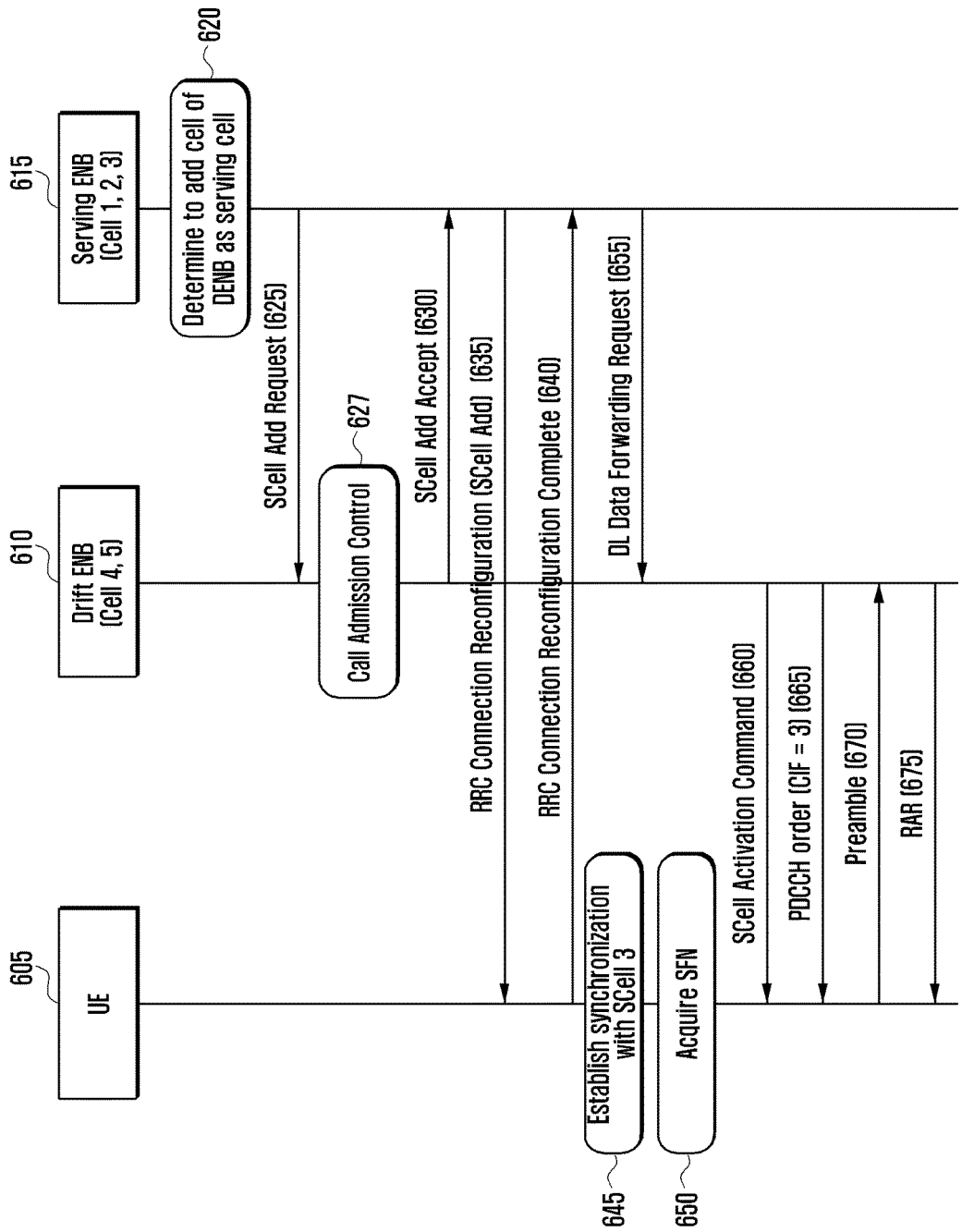
FIG. 6 is a diagram illustrating operations of UE and eNB for configuring a SCell belonging to a non-primary set.

FIG. 6 is a diagram illustrating operations of UE and eNB for configuring a SCell belonging to a non-primary set.

In this embodiment, the eNB 1 615 is referred to as a serving eNB, and the eNB 2 610 as a drift eNB.

Referring to FIG. 6, the serving eNB 615 determines to add a cell of the drift eNB 610 as a serving cell at step 620. Depending on the embodiment, this determination may be performed in such a way that the serving eNB 615 adds a SCell to the UE 605 at a certain time point. In an embodiment, if the UE 605 is located within an area of the cell under the control of the eNB 2 610, the serving eNB 615 may determine to add the cell under the control of the eNB 2 610 as the SCell. This determination may be made based on the data amount which the UE 605 transmits/receives.

The serving eNB 615 sends the eNB 2 610 a control message requesting for adding a SCell at step 625. In an embodiment, the control message may include at least one of the following information.

TABLE 2

| Name | Description |
|---|---|
| SCell id information | Information related to identifiers of SCells to be configured by the drift eNB. Formed with one or more sCellIndex-r10. Determined by the serving cell and notified to the drift eNB to prevent the identifier in use by the serving eNB from being reused. The ranges of SCell id used by the serving eNB and the drift eNB may be defined separately. For example, SCell ids 1~3 may be defined in advance for use in serving eNB while SCell ids 4~7 for use in drift eNB. |
| TAG id information | Information related to identifier of TAG to be configured by the drift eNB. Defined by the serving eNB and notified to the drift eNB to prevent the identifier in used by the serving eNB from being reused. |
| UL scheduling information | Include priority informations of logical channels and logical channel group information configured to the UE. The drift information interprets the UE buffer state report information and performs uplink scheduling using this information. |
| Inform on bearer to be offloaded | It is preferred that the drift eNB processes the service requiring large amount data transmission/reception, e.g. FTP download. The serving eNB determines the bearer to be offload to the eNB among the bearers configured to the UE and sends the drift eNB the information on the bearer to be offloaded, e.g. DRB identifier, PDCP configuration information, RLC configuration information, required QoS information. |

TABLE 2-continued

| Name | Description |
| --- | --- |
| Call accept control information | The serving eNB provides the drift eNB with reference information for use in determining whether to accept SCell add request. For example, this information may include required data rate, expected uplink data amount, and expected downlink data amount. |

If the SCell add request control message is received, the drift eNB 610 determines whether to accept the request in consideration of the current load status. In an embodiment, the step of determining whether to accept the request is referred to as Call Admission Control.

If it is determined to accept the request, the drift eNB 610 generates a control message including at least one of the following information and transmits the control message to the serving eNB 615.

TABLE 3

| Name | Description |
| --- | --- |
| SCellToAddMod | Information related to SCells configured by the drift eNB as follows. sCellIndex-r10, cellIdentification-r10, radioResourceConfigCommonSCell-r10, radioResourceConfigDedicatedSCell-r10, TAG-related information |
| PUCCH information for PUCCH SCell | At least one of SCells belonging to the non-primary set is configured with Physical Uplink Control Channel (PUCCH). Uplink control information such as HARQ feedback, Channel Status Information (CSI), Sounding Reference Signal (SRS), and Scheduling Request (SR) may be transmitted. Hereinafter, the SCell in which PUCCH is transmitted is referred to as PUCCH SCell. The PUCCH SCell identifier and PUCCH configuration information are the sub-informations of this information. |
| Information for data forwarding | Logical channel (or logical tunnel) for use in data exchange between the serving eNB and drift eNB. May include GPRS Tunnel Protocol (GTP) tunnel identifier for downlink data exchange and GTP tunnel identifier for uplink data exchange. |
| UE identifier | C-RNTI for use by UE in SCells of non-primary set. Hereinafter, referred to as C-RNTI_NP |
| Bearer configuration information | Configuration information on the bearer to be offloaded. May include list of bearers accepted to be offloaded and per-bearer configuration information. If the bearer configurations are identical, it is possible to include only the list of bearers accepted. |

If the control message of step 630 is received at step 630, the serving eNB 615 sends the UE 605 a message instructing to add the serving cell at step 635. Depending on the embodiment, the serving eNB 615 may sends the UE 605 the control message using a RRC control message. The RRC control message may include at least one of the following information.

TABLE 4

| Name | Description |
| --- | --- |
| SCellAddMod | This may include the information transmitted from the drift eNB to the serving eNB as it was. That is, this is identical with SCellAddMod in table 3. The SCellAddMod is included per SCell and is sub-information of SCellAddModList. |
| PUCCH information for PUCCH SCell | This may include the information transmitted from the drift eNB to the serving eNB as it was. That is, this is identical with PUCCH information for PUCCH SCell in table 3. |
| Non-primary SCell List | This is the information on the SCells belonging to the non-primary set among the SCells to be configured. This may be the identifiers of the SCells or the TAGs belonging to the non-primary set. |
| UE identifier | This is C-RNTI for use by the UE in the serving cell of the non-primary set. |
| Offload bearer information | This is the information on the bearers to be processed by the drift eNB. This is the information on the bearers to be transmitted/received through the serving cells of the non-primary set in view of the UE and, if the bearer lists and bearer configurations are different, may include bearer configuration information. |

Figure 7:
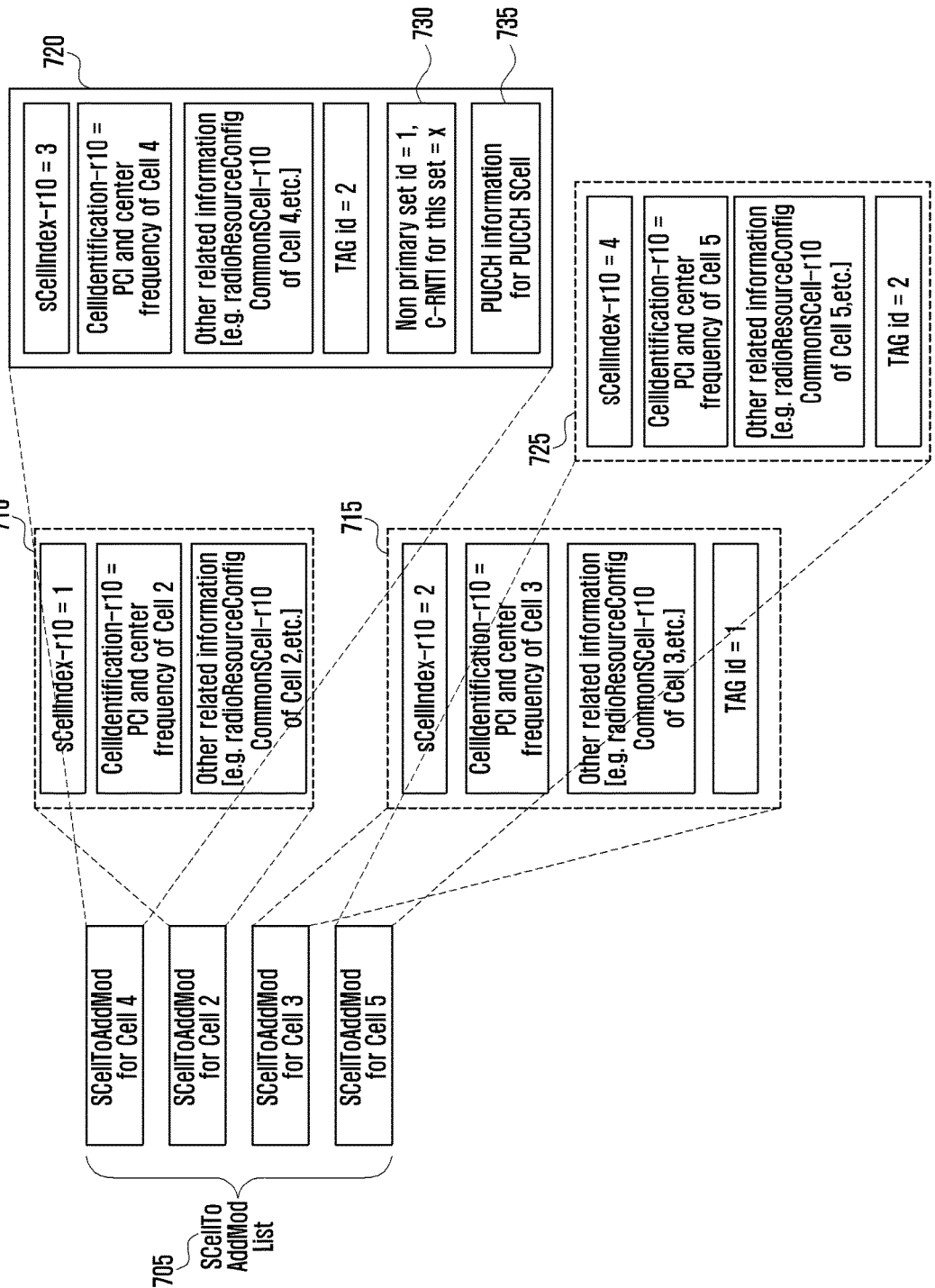
FIG. 7 is a diagram illustrating an exemplary RRC control message including SCell configuration information.

The RRC control message may include the configuration information on multiple SCells. The RRC control message also may include the configuration of the primary and non-primary sets serving cells. For example, if Cell 2, Cell 3, Cell 4, and Cell 5 are configured as the SCells of the UE having the Cell 1 as its PCell, the RRC control message may include the above informations arranged in various orders as exemplified in FIG. 7. Referring to FIG. 7, the Cell 1 and Cell 2 have the same uplink transmission timing to form the P-TAG, the Cell 3 forms the S-TAG 1, and the Cell 4 and Cell 5 form the S-TAG 2.

The RRC control message contains SCellToAddModList 705 including SCellToAddMod 710 for Cell 2, SCellToAddMod 715 for Cell 3, SCellToAddMod 720 for Cell 4, and SCellToAddMod 725 for Cell 5. The SCellToAddMod may include specific information or not depending on the characteristic of the corresponding SCell. If the SCell belongs to the P-TAG, i.e. if the SCell has the same uplink transmission timing as the PCell, the corresponding SCellToAddMod does not include the information related to the TAG. For example, the SCellToAddMod for the Cell 2 does not include the information about TAG. The SCellToAddMod for each of the SCells belonging to the rest TAGs includes the TAG identifier and TA timer value for the TAG to which the corresponding SCell belongs. The information on at least one of the cells belonging to the non-primary set may include the non-primary set information 730, e.g. non-primary set identifier and C-RNTI for use by the UE in the non-primary set. In the example of FIG. 7, the SCellToAddMod for the Cell 4 includes the non-primary set information. The information on one of the cells belonging to the non-primary set includes the PUCCH configuration information 735. In the example of FIG. 7, the SCellToAddMod for the Cell 4 includes the above information. To the SCell which belongs to the non-primary set but has no information on the non-primary set, the information on the non-primary set of the SCell having the same TAG id. For example, although the information on the Cell 5 includes no non-primary set information, the UE is capable of determining that the Cell 5 belongs to the non-primary set based on the non-primary set information of the Cell 4 having the same TAG id and uses the non-primary set identifier and C-RNTI, which are identical with those of the Cell 4, for the Cell 5.

Figure 8:
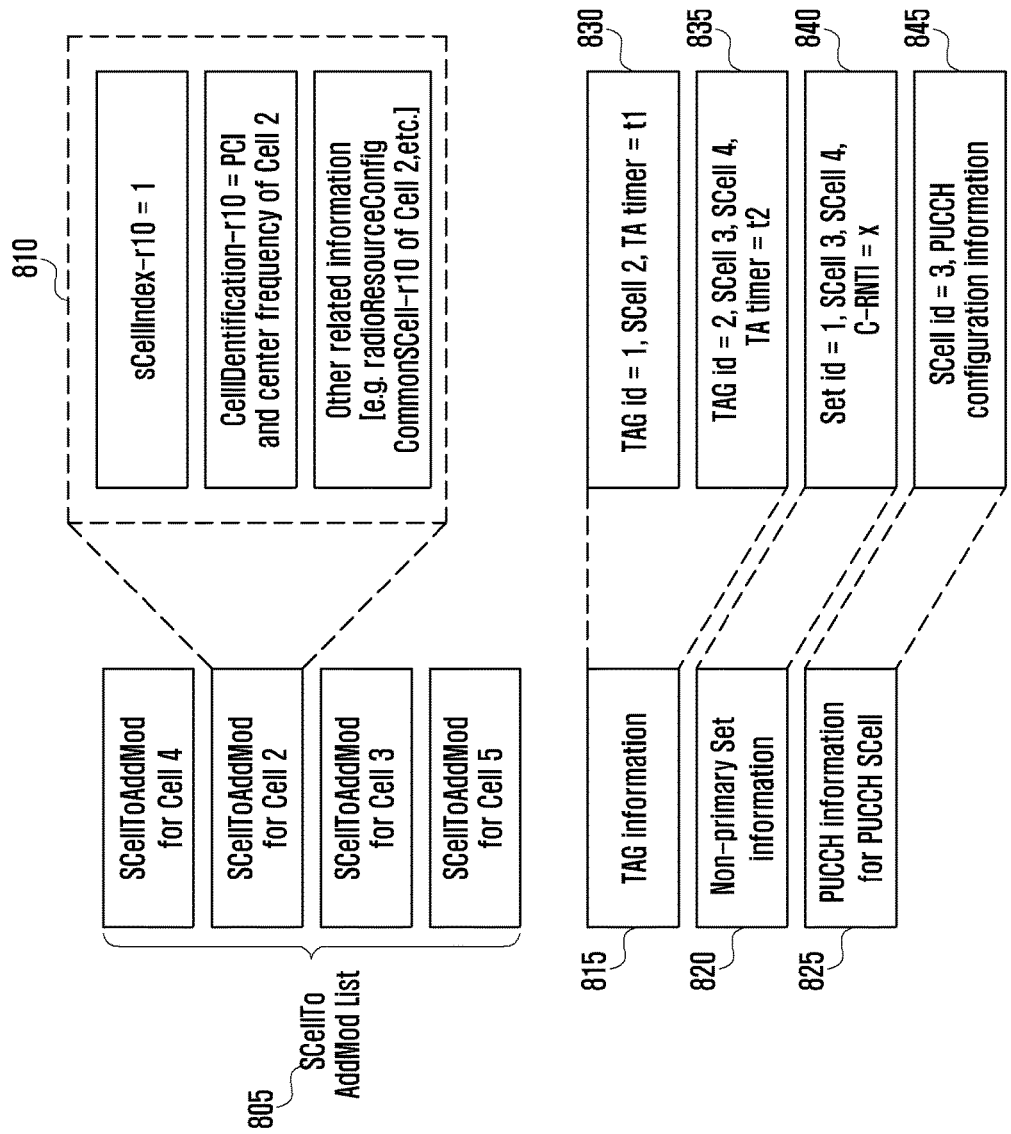
FIG. 8 is a diagram illustrating another exemplary RRC control message including SCell configuration information.

FIG. 8 is a diagram illustrating another example of arranging the TAG information and the non-primary set information at a location other than SCellToAddMod.

The RRC control message carries the SCellToAddModList 805 including SCellToAddMod 810 for Cell 2, SCellToAddMod for Cell 3, SCellToAddMod for Cell 4, and SCellToAddMod for Cell 5. The SCellToAddMod contains the same type of information. That is, every SCellToAddMod may include sCellIndex-r10, cellIdentification-r10, and radioResourceConfigCommonSCell-r10.

The TAG information 815, the non-primary set information 820, and the PUCCH configuration information of PUCCH SCell are included separately. The TAG information 815 may include the TAG identifiers, identifiers of the SCells forming the TAG, and TA timer value. For example, the TAG information 815 may include the information 830 notifying that the TAG having the TAG identifier 1 includes the SCell 2 and the TA timer is set to the value t1 and the information 835 notifying that the TAG having the TAG identifier 2 includes the SCell 3 and SCell 4 and the TA timer is set to the value t2.

The non-primary set information 820 may include the per-non-primary set identifiers, identifiers of the serving cells included in the set, and C-RNTI for use in the corresponding set. For example, the information 840 indicating that the non-primary set having the set identifier 1 includes the SCell 3 and SCell 4 and uses the C-RNTI x. The primary set information is not signaled explicitly but determined according to the following rule.

Primary Set Information Determination Rule

Serving cells belonging to primary set: PCell and SCells not belonging to any non-primary set.

C-RNTI for use in primary set: C-RNTI in use in current PCell.

The non-primary set information may include the TAG identifier other than the SCell identifier. This is possible under the assumption that the set and TAG are formed such that one TAG is not formed across multiple sets. For example, the non-primary set configuration information 820 includes the information indicating the TAG id 2 instead of the information indicating the SCell 3 and SCell 4 in order for the UE to determine that the SCell 3 and SCell 4 having the TAG id 2 belong to the non-primary set.

The PUCCH SCell's PUCCH configuration information is made up of non-primary set identifier, PUCCH SCell identifier, and PUCCH configuration information. Each non-primary set has one PUCCH SCell. The CSI information for the serving cells belonging to the non-primary set and HARQ feedback information is transmitted on the PUCCH configured to the PUCCH SCell.

The PUCCH SCell can be determined according to a predetermined rule without signaling PUCCH SCell identifier explicitly. For example, the SCell corresponding to the first SCellToAddMod of the SCellToAddModList may be determined as the PUCCH SCell. Also, the SCell having the highest or lowest SCell identifier among the SCells of which information includes the SCellToAddMod information in the corresponding RRC control message may be determined as the PUCCH SCell. Such an implicit determination method can be used under the assumption that only one non-primary set exists.

The UE 605 sends the serving eNB 615 a response message at step 640.

The UE 605 establishes downlink synchronization with newly configured SCells at step 645.

The UE 605 acquires System Frame Number (SFN) of the PUCCH SCell among the newly configured SCells at step 650. The SFN may be acquired in the procedure of receiving the system information, i.e. Master Information Block (MIB). Depending on the embodiment, the SFN is an integer incrementing by 1 at every 10 ms in the range from 0 to 1023. The UE 605 checks the PUCCH transmission timing of the PUCCH SCell using the SFN and PUCCH configuration information.

Afterward, the UE waits until the SCells are activated. If downlink data or a predetermined control message instructing to activate SCell is received from the serving eNB 615 at step 655, the drift eNB 610 starts a procedure of activating the SCells. The serving eNB 615 sends the drift eNB a downlink data forwarding request at step 655.

The drift eNB 610 may transmit a message for activating at least one of the SCells at step 660. In this embodiment, the drift eNB 610 sends the UE 605 the A/D MAC CE instructing to activate the SCell 3. If the MAC CE is received at the subframe n, the UE 605 activates the SCell at subframe (n+m1). However, since the uplink synchronization of the PUCCH SCell is not acquired yet at the subframe (n+m1), both the downlink and uplink transmission/reception are not possible although the SCell has been activated. That is, the UE 605 monitors PDCCH of the SCell but may ignore the downlink/uplink resource allocation signal although it is received.

The drift eNB 610 sends the UE 605 a random access command to establish uplink synchronization with the PUCCH SCell at step 665. Upon receipt of this command, the UE 605 initiates random access procedure in the PUCCH SCell using the dedicated preamble indicated by the command.

The UE 605 sends the drift eNB 610 a preamble in the SCell at step 670. The UE 605 also monitors PDCCH to receive the RAR in response to the preamble. In this embodiment, if the UE 605 has transmitted the preamble through the primary set, the RAR is transmitted to the UE 605 through the PCell. Otherwise if the preamble has been transmitted through a non-primary set, the UE 650 monitors PDCCH of the SCell through which the preamble has been transmitted or the PDCCH of PUCCH SCell. This is because there is a need of supplementary information exchange between the drift base station 610 and the serving eNB 615 to process the RAR in the PCell. The RAR may be received with the C-RNTI to be used in the non-primary set. It is more efficient to transmit the response message with the C-RNTI because the UE 605 also has been allocated the C-RNTI and there is no probability of malfunctioning caused by collision due to the use of the dedicated preamble (i.e. since the eNB knows the UE to which the RAR has to be transmitted based on the dedicated preamble). If the valid response message is received through the SCell in which the preamble has been transmitted or the PUCCH SCell, the UE 605 adjusts the uplink transmission timing of the PUCCH SCell and the TAG to which the PUCCH SCell based on the TA command of the response message and activates uplink at a predetermined time point. If the valid TA command or the valid random access response message is received at the subframe n, the predetermined timing becomes the subframe (n+m2). Here, m2 is a predetermined integer.

In an embodiment, if the inter-eNB carrier aggregation is applied, the eNBs 610 and 615 may manage different serving cells. For example, the activation/deactivation of a serving cell x is in charge of the eNB a while the activation/deactivation of a serving cell y is in charge of the eNB b. Since the current A/D MAC CE designed in consideration only the intra-eNB carrier aggregation uses one bitmap carrying the status informations of all serving cells, if the serving cells are managed by multiple eNBs, the eNB cannot write the information of the A/D MAC CE correctly.

Figure 9:
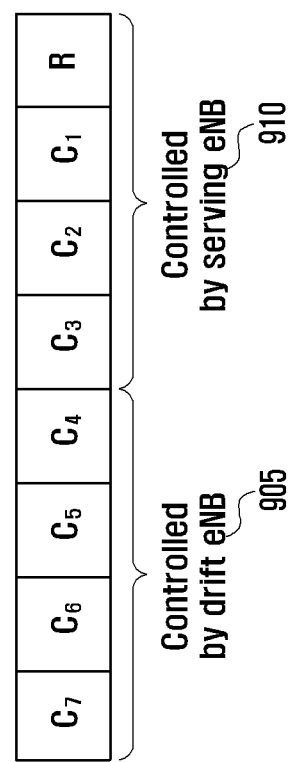
FIG. 9 is a diagram illustrating a format of the AD MAC CE.

FIG. 9 is a diagram illustrating a format of the AD MAC CE.

Referring to FIG. 9, the A/D MAC CE includes a MAC sub-header and payload. The MAC sub-header may include at least one of a Logical Channel ID (LCID) indicating the type of the payload and E bit indicating whether another MAC sub-header exists. The payload is a bitmap of 1 byte of which each bit indicates the activated state of the cell corresponding to the SCell index. In more detail, the C7 bit of the bit map indicates the state of the serving cell of which SCell index is 1 (hereinafter, the serving cell of which SCell index is x is referred to as SCell x), the C6 bit indicates the state of the SCell 6, and the C1 bit indicates the state of the SCell 1.

For example, it is assumed that the SCell 1 to SCell 3 910 are the serving cells controlled by the serving eNB, i.e. serving cells of the primary set, and the SCell 4 to SCell 7 905 are the serving cells controlled by the drift eNB, i.e. the serving cells of the non-primary set. In order to instruct the UE to activate/deactivate a serving cell using the current A/D MAC CE, the serving eNB may inquire of the drift eNB about the state of the serving cell, and the drift eNB may inquire of the serving eNB about the stat of the serving cell.

Figure 10:
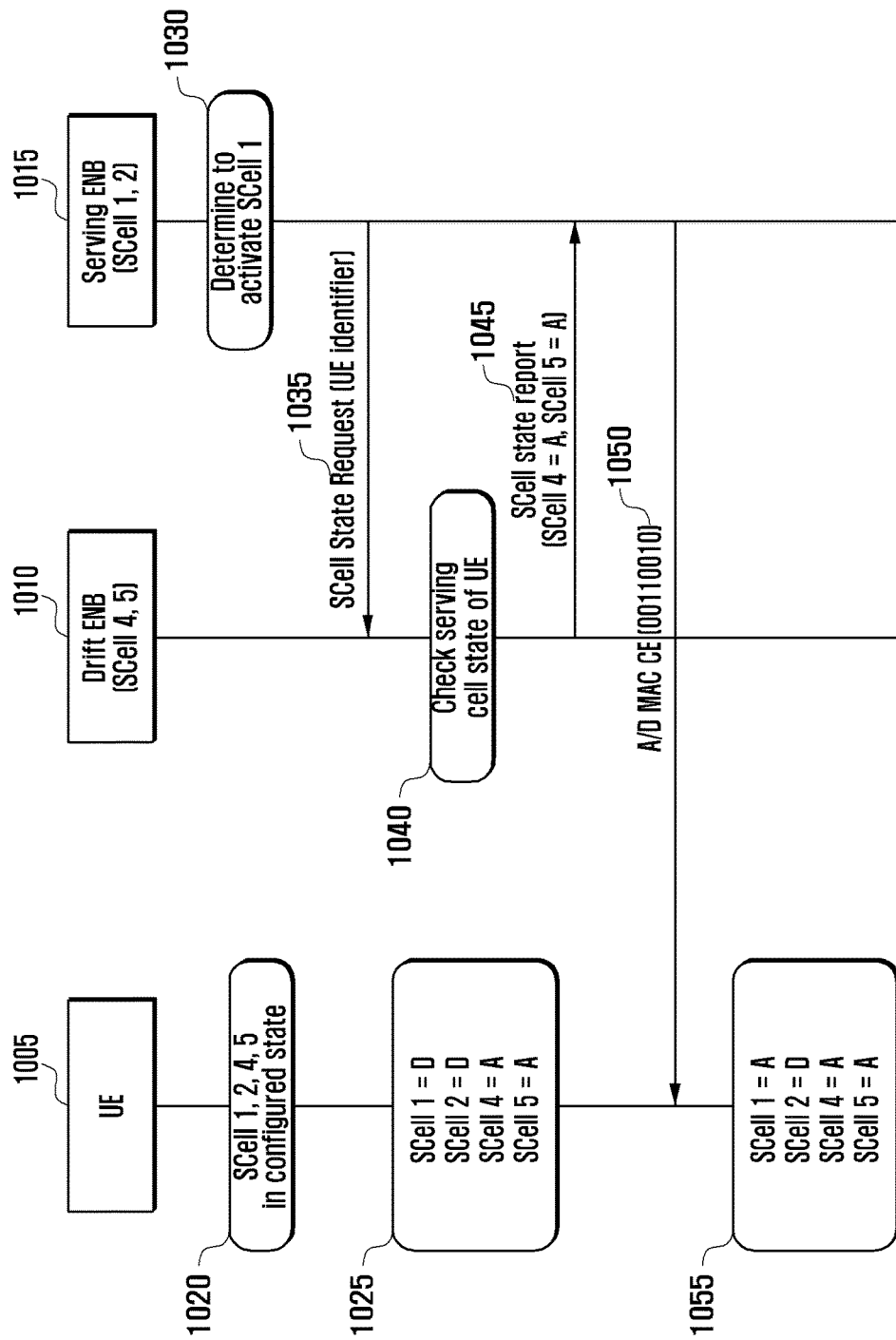
FIG. 10 is a diagram illustrating the procedure of activating/deactivating the primary set and non-primary set serving cells according to an embodiment of the present invention.

FIG. 10 is a diagram illustrating the procedure of activating/deactivating the primary set and non-primary set serving cells according to an embodiment of the present invention.

Referring to FIG. 10, SCell 1, SCell 2, SCell 4, and SCell 5 are configured to the UE 1005 at a certain time point at step 1020. The SCell 1 and SCell 2 are the serving cells of the primary set, and the SCell 4 and SCell 5 are the serving cells of the non-primary set.

At step 1025, the SCell 1 and SCell 2 are in the deactivated, and the SCell 4 and SCell 5 are in the activated state.

The serving eNB 1015 determines to activate the SCell 1 at step 1030. The serving eNB 1015 sends the drift eNB 1010 a SCell state request control message at step 1035. According to an embodiment, the control message may be transmitted to the drift eNB 1010 at a certain time point. The control message may include a UE identifier and a SCell index for use in checking the SCell state.

The drift eNB 1010 generates a SCell state report control message including the state information of the SCells, i.e. the SCells of the non-primary set, which it controls among the SCells of the UE 1005 and sends this message to the serving eNB 1015 at step 1045.

The serving eNB 1015 generates the A/D MAC CE including the state information of the serving cells configured to the UE 1005 and sends the A/D MAC CE to the UE 1005 at step 1050. The content of the A/D MAC CE may be determined based on the message received at step 1045. In an embodiment, the serving eNB 1015 determines to activate the SCell 1 and thus the payload of the A/D MAC CE to be transmitted is formed as follows.

| $C_7$ | $C_6$ | $C_5$ | $C_4$ | $C_3$ | $C_2$ | $C_1$ | R |
|---|---|---|---|---|---|---|---|
| 0 | 0 | 1 | 1 | 0 | 0 | 1 | 0 |

That is, the serving eNB 1015 is capable of set the C1 and C2 as the state informations of the serving cells which it manages to appropriate values. The appropriate values may be determined depending on whether the SCell 1 and SCell 2 are activated. The serving eNB 1015 sets the C4 and C5 as the state information of the serving cell which the drift eNB 1010 manages to the values notified in the SCell state report message received at step 1045 and the rest bits to a predetermined value, e.g. 0.

The UE 1005 activates the SCells instructed to activate in the received A/D MAC CE and deactivates the SCells instructed to deactivate in the received A/D MAC CE at step 1055. At this time, the bits which are not related to the configured SCells, e.g. the values of C7, C6, and C3 are ignored.

Figure 11:
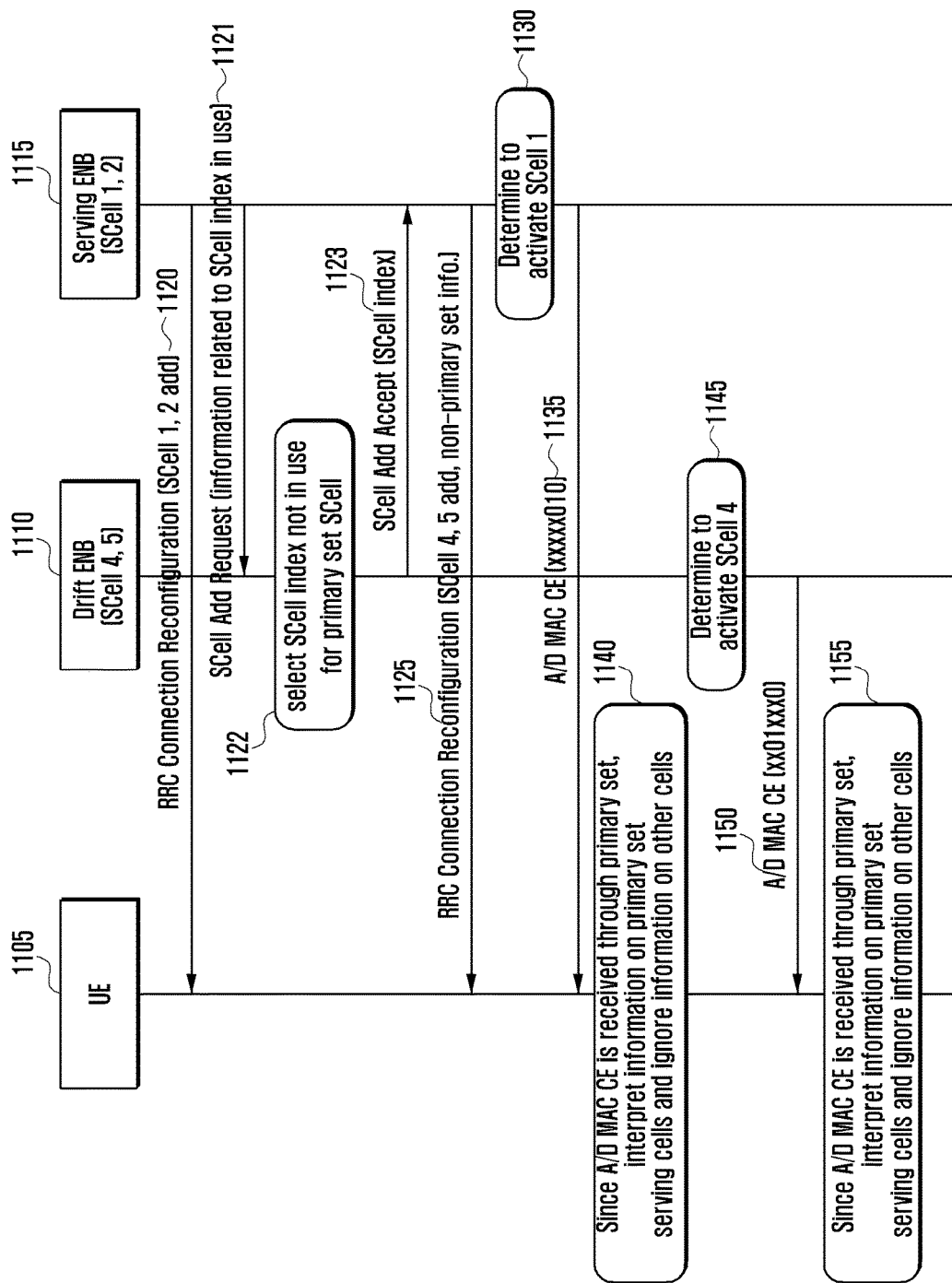
FIG. 11 is a diagram illustrating the procedure of activating/deactivating the primary set and non-primary set serving cells according to another embodiment of the present invention.

According to an embodiment of the present invention, the UE may check the set to which the serving cell through which the A/D MAC CE has been received belongs instead that the eNB inquires of the counterpart eNB the active/deactivated information of the corresponding cell. FIG. 11 shows the entire operation.

FIG. 11 is a diagram illustrating the procedure of activating/deactivating the primary set and non-primary set serving cells according to another embodiment of the present invention.

Referring to FIG. 11, the serving eNB 1115 configures the SCell 1 and SCell 2 to the UE 1105 at a certain time point at step 1120. In this embodiment, the SCell configuration is performed using the RRC connection reconfiguration message of step 520 of FIG. 5. In this embodiment, when the RRC connection reconfiguration has no information notifying that the serving cells to be added belongs to the non-primary set, the UE 1105 assumes that the newly added SCell 1 and SCell 2 are the serving cells of the primary set.

Afterward, the serving eNB 1115 determines to add a serving cell under its control to the UE 1105 at a certain time point at step 1121. The serving eNB 1115 sends the drift eNB 1110 a control message requesting to add the SCell. The serving eNB 1115 generates the controls message including the information for use by the drift eNB 1110 in selecting the SCell index. This information may be a list of the SCell indices in use by the serving cell 1115 or a list of the SCell indices available for use by the drift eNB 1110. The drift eNB 1110 may select a SCell index based on this information.

The drift eNB 1110 performs Call Admission Control and, if it is accepted to add the SCell, determines the SCell-related parameters at step 1122. For example, the drift eNB 1110 may determine the SCell index to be used in the SCell of the drift eNB 1110 using the information for use in selecting the SCell index which has been transmitted by the serving eNB 1115.

At step 1124, the drift eNB 1110 sends the serving eNB 1115 a SCell Add Accept control message including the information determined at step 1122. In this embodiment, it is assumed that the drift eNB 1110 configures two SCells of which SCell indices are SCell 4 and SCell 5.

The serving eNB 1115 sends the UE 1105 a predetermined control message, e.g. RRC connection reconfiguration, to configure the SCell 4 and SCell 5 under the control of the drift eNB 1110 at step 1125. If the control message of step 1125 is received, the UE 1105 configures the SCells based on the received message. In this embodiment, the UE 1105 configures the SCell 4 and SCell 5. The control message includes at least one of the information notifying that the SCell 4 and SCell 5 belong to the non-primary set and the information notifying that the SCell 4 and SCell 5 are under control of an eNB which is not the serving eNB.

The serving eNB 1115 determines to activate the SCell 1 at step 1130. The activation determination may be made at a certain time point. For example, if the channel state of the SCell 1 improves or if the traffic increases at the UE 1105, the serving eNB 1115 can make such a determination.

The serving eNB 1115 set C1 and C1 as the information on the serving cells, i.e. SCell 1 and SCell 2, for use in determining whether to activate/deactivate to appropriate values and R bit to 0 at step 1135. Next, the serving eNB 1115 sends the UE 1105 the A/D MAC CE in which the bits corresponding to the SCells not under its control to a predetermined value, e.g. 0. In the drawing of this embodiment, the bits of the SCells not under its control are expressed by x for convenience purpose. Depending on the embodiment, the R bit may be set to an alternative value.

If the A/D MAC CE is received, the UE 1105 determines whether the serving cell through which the A/D MAC CE has been received belongs to the primary set or the non-primary set at step 1140. In interpreting the information of the A/D MAC CE received through the primary set serving cell, the UE checks only the information on the serving cells belonging to the primary set, i.e. C1 and C2, for activation/deactivation operation and ignores the rest bits. For example, although C4 and C5 are set to 0 or 1, the state information on the SCell 4 and SCell 5 are not reflected. In this embodiment, the UE 1105 received the A/D MAC CE and determines whether to activate or deactivate the corresponding cell based on the activation information for the SCell under the control of the eNB which has transmitted the A/D MAC CE among the activation informations of the SCells written in the received A/D MAC CE. The drift eNB 1110 determines to activate the SCell 4 at step 1145. This determination may be made at a certain time point and, in more detail, based on at least one of the state of the cell under the control of the drift eNB 1110 and the traffic condition of the UE 1105.

At step 1150, the drift eNB 1110 sets the informations on the serving cells determined to activate/deactivate, i.e. C4 and C5 of SCell 4 and SCell 5, to an appropriate value and R bit to 0. The drift eNB 1110 also sends the UE 1105 the A/D MAC CE including the bits which correspond to the SCells not under its control and which are set to a predetermined value, e.g. 0. In the drawing of this embodiment, the bits of the SCells not under its control are expressed by x for convenience purpose. Depending on the embodiment, the R bit may be set to an alternative value.

If the A/D MAC CE is received, the UE 1105 determines whether the serving cell through which the A/D MAC CE has been received belongs to the primary set or the non-primary set. In an embodiment, when interpreting the information of the A/D MAC CE received through the non-primary set serving cell, the UE checks only the information on the serving cells belonging to the non-primary set, i.e. C4 and C5, for activation/deactivation operation and ignores the rest bits without interpretation. For example, although C1 and C2 are set to 0 or 1, the state information on the SCell 1 and SCell 2 are not reflected.

In an alternative embodiment, it is possible for the UE to discriminate between the A/D MAC CE for the primary set and the A/D MAC CE for the non-primary set by LCID instead of determining the operation based on the set through which the A/D MAC CE has been received. For example, it is possible to define the first A/D MAC CE for the primary set serving cells and the second A/D MAC CE for the secondary set serving cells. The first and second A/D MAC CEs may be determined differently in order depending on the embodiment, and the determined order may be shared in advance or signaled using an explicit message.

In an embodiment, the first A/D MAC CE and the second MAC CE may be identified by the LCID. The LCID of the first A/D MAC CE may be 11011 identical with that of the conventional A/D MAC CE, and the LCID of the second A/D MAC CE may be set to a reserved value, e.g. 11010. The first and second A/D MAC CEs may be, in format, identical with or different from each other. The second A/D MAC CE is made up of two bytes, the first byte for C7-C1 and the second byte for information indicating which non-primary set is targeted by the second A/D MAC CE.

If the set targeted by the A/D MAC CE is identified by the LCID, the serving eNB may activate or deactivate the serving cell of the non-primary set depending on the case. Also, the drift eNB may activate or deactivate the serving cell of the primary set.

Figure 12:
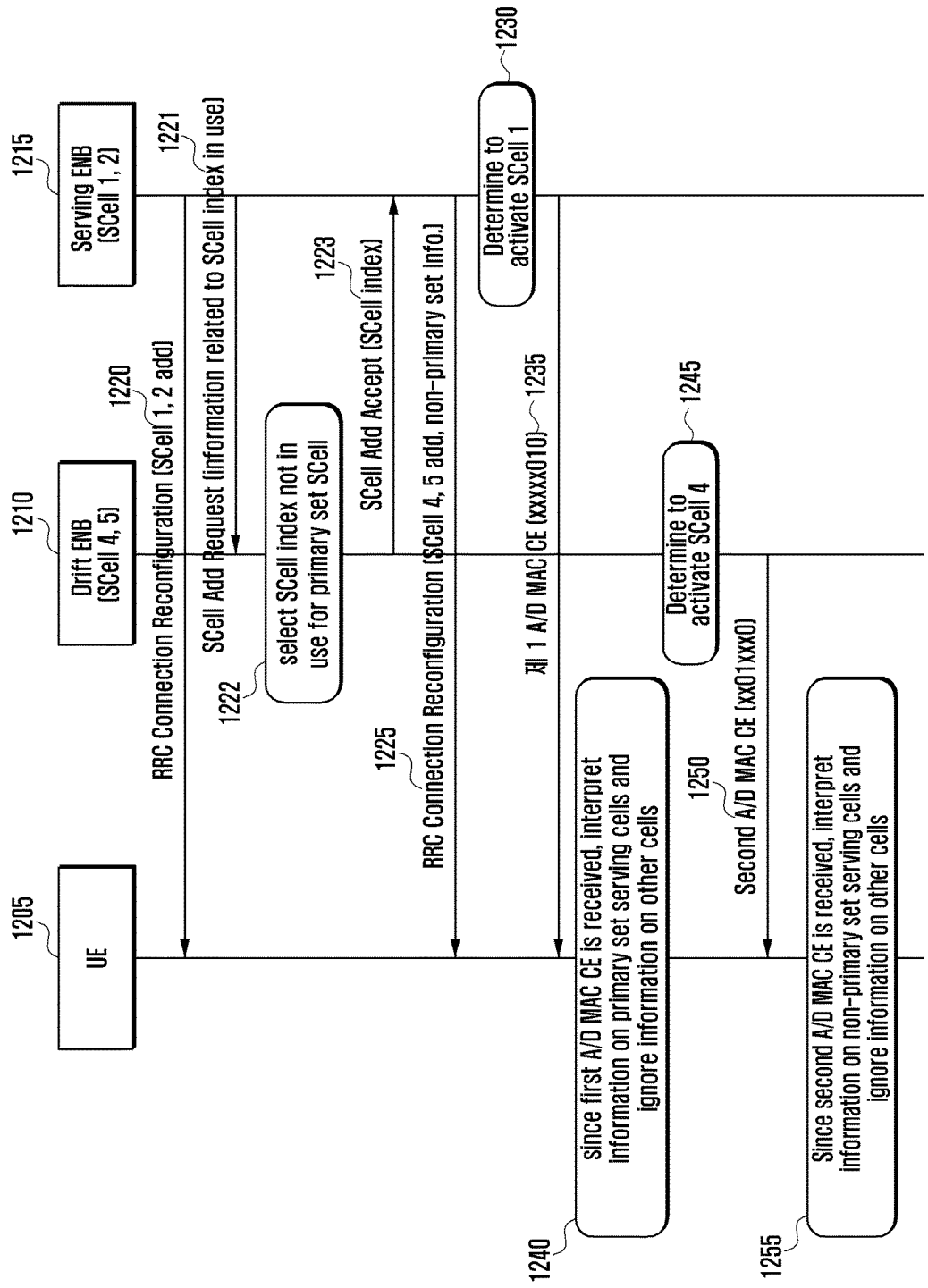
FIG. 12 is a diagram illustrating a procedure of activating and deactivating SCells using the first and second A/D MAC CEs.

FIG. 12 is a diagram illustrating the procedure of activating and deactivating SCells using the first and second A/D MAC CEs.

Referring to FIG. 12, steps 1220, 1221, 1222, 1223, 1225, and 1230 may be performed in the similar to or identical manner with steps 1120, 1121, 1122, 1123, 1125, and 1130 of FIG. 11.

The serving eNB 1215 sends the UE 1205 the first A/D MAC CE at step 1235.

The serving eNB 1215 sets C1 and C2 as the informations on serving cells determined to activate/deactivate, i.e. SCell 1 and SCell 2, to appropriate values and the R bit to 0. The serving eNB 1215 also sets the bits corresponding to the SCells that are not under its control to a predetermined value, e.g. 0. The serving eNB 1215 sets the LCID of the MAC sub-header to a value indicating the first A/D MAC CE and transmits the A/D MAC CE to the UE 1205. In the drawing of this embodiment, the bits of the SCells not under its control are expressed by x for convenience purpose but may be set to one of 0 and 1.

If the first A/D MAC CE transmitted by the serving cell 1215 is received at step 1235, the UE 1205 interprets only the information on the serving cells belonging to the primary set, i.e. C1 and C2, to perform activation/deactivation and ignores the rest bits without interpretation. For example, although C4 and C5 are set to 0 or 1, the information is not reflected to the state of the SCell 4 and SCell 5. Depending on the embodiment, the first A/D MAC CE may be received through the serving cell of a non-primary set.

The drift eNB 1210 determines to activate the SCell 4 at step 1245. Depending on the embodiment, this determination is made at a certain time point based on the communication state of the cell under the control of the drift eNB 1210 or the communication load at the UE 1205.

At step 1250, the drift eNB 1210 sets the informations on the serving cells determined to activate/deactivate, i.e. C4 and C5 of SCell 4 and SCell 5, to an appropriate value and R bit to 0. The R bit may be set variably depending on the embodiment. The drift eNB also sets the bits corresponding to the SCells that are not under its control to an appropriate value, e.g. 0. The drift eNB sets the LCID of the MAC sub-header to a value indicating the second A/D MAC CE and transmits the A/D MAC CE to the UE 1205. In the drawing of this embodiment, the bits of the SCells not under its control are expressed by x for convenience purpose but set diversely depending on the embodiment.

If the second A/D MAC CE is received at step 1250, the UE 1210 interprets the informations on only the serving cells belonging to the non-primary set, i.e. C4 and C5, to activate/deactivate corresponding serving cells and ignores the rest bits without interpretation. For example, although C1 and C2 are set to 0 or 1, the above information is not reflected to the states of the SCell 1 and SCell 2. At this time, the UE 1210 assumes that the PUCCH SCell is in the activated state always without interpreting the bit corresponding to the PUCCH SCell.

Figure 13:
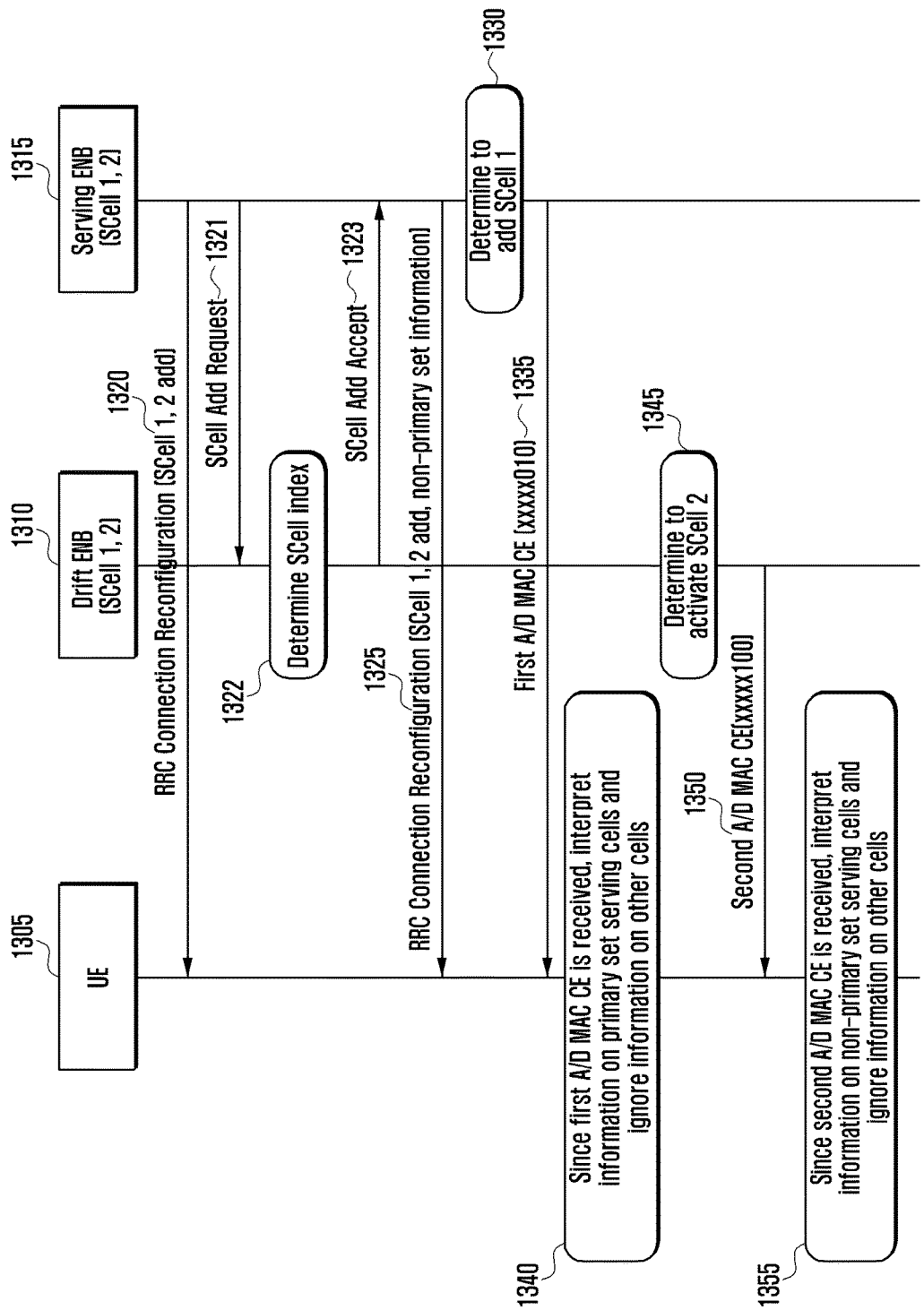
FIG. 13 is a diagram illustrating an alternative procedure of activating/deactivating the SCells.

FIG. 13 is a diagram illustrating an alternative procedure of activating/deactivating the SCells.

Referring to FIG. 13, the drift eNB 1310 and the serving eNB 1315 select the SCell index without consideration on whether the corresponding index is in use in another set. Accordingly, one SCell index may be allocated to one or more serving cells, and the UE 1305 determines which serving cell the SCell index indicates based on the type of the A/D MAC CE or the serving cell through which the A/D MAC CE has been received.

In this embodiment, the serving eNB 1315 controls the cells a and b, and the drift eNB 1310 controls the cells c and d. In an embodiment, step 1320 may be executed in the same manner as or similar manner to step 1120 of FIG. 11.

The serving eNB 1315 sends the drift eNB 1310 a control message requesting for adding SCell at step 1321.

The drift eNB 1310 determines whether to add the serving cell and, if it is determined to add the serving cell, determines the parameters related to the serving cell at step 1322. The drift eNB 1310 may not consider whether a certain index is used in another eNB in determining the SCell index to be applied to the serving cell. In this embodiment, if the drift eNB 1310 has an algorism of allocating the SCell index in an ascending order, it allocates the SCell index 1 and SCell index 2 to the newly added serving cells, i.e. cell c and cell d. at this time, the drift eNB 1310 may allocates a predetermined index to the PUCCH SCell. In an embodiment, if the SCell index of the PUSCH SCell is fixed to 0, there is no need of signaling the SCell index of the PUCCH SCell explicitly.

The drift eNB 1310 sends the serving eNB 1315 a SCell Add Accept control message at step 1323.

The serving eNB 1315 sends the UE 1305 a message including the information for use in adding the SCell at step 1325. Depending on the embodiment, this message may be transmitted through the RRC connection reconfiguration control message.

The serving eNB 1315 determines to activate the SCell 1 at step 1330. The SCell activation may be determined based on the channel state or traffic of the UE 1305.

The serving eNB 1315 sends the UE 1305 an A/D MAC CE at step 1335. The serving eNB 1315 sets C1 and C2 as the information on serving cells determined to activate/deactivate, i.e. SCell 1 and SCell 2, to appropriate values and the R bit to 0. Depending on the embodiment, the R bit may be set variably. The serving eNB 1315 sets the bits corresponding to the SCells that are not under its control to a predetermined value, e.g. 0. Depending on the embodiment, the A/D MAC CE may be a normal A/D MAC CE or the first A/D MAC CE including specific LCID.

At step 1340, the UE 1305 receives the A/D MAC CE transmitted at step 1335. The UE 1305 determines whether the serving cell through which the A/D MAC CE has been received is a primary set serving cell or a non-primary set serving cell and, if serving cell is a primary set serving cell, activates/deactivated only the primary set serving cells based on the content of the A/D MAC CE. That is, when two SCell 1 are configured to the UE 1305, if the serving cell through which the A/D MAC CE has been received is the primary set serving cell, the SCell 1 of the primary set is activated or deactivated. If the first A/D MAC CE has been received, only the primary set serving cells are activated/deactivated based on the content of the A/D MAC CE.

The drift eNB 1310 determines to activate the SCell 2 at step 1345. Whether to activate or not is determined based on the channel state or the traffic of the UE 1305.

The drift eNB 1310 sends the UE 1310 an A/D MAC CE at step 1350. The A/D MAC CE may be the normal A/D MAC CE or the second A/D MAC CE including a specific LCID. At this time, the drift eNB 1310 sets the bit corresponding to the PUCCH SCell to a predetermined value, e.g. 0.

If the A/D MAC CE is received at step 1350, the UE 1305 determines the set of which serving cells are to be activated or deactivated based on the serving cell through which the A/D MAC CE has been received or the type of the A/D MAC CE. In this embodiment, the UE 1305 assumes that the PUCCH SCell is always in the activated state so as to ignore the bit corresponding to the PUCCH SCell.

Figure 14:
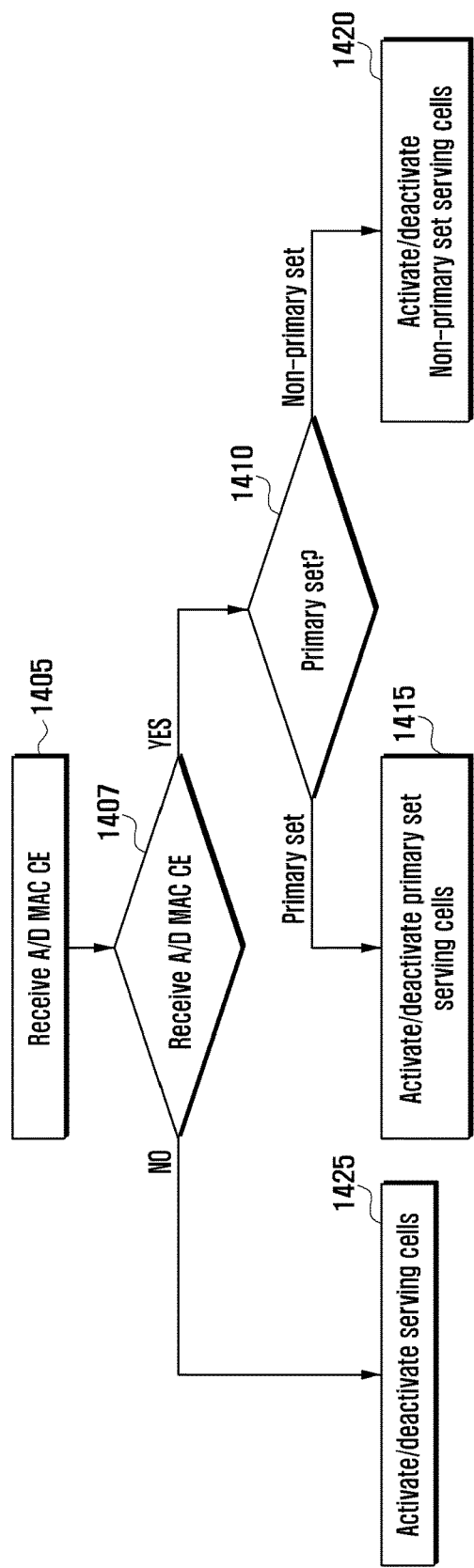
FIG. 14 is a flowchart illustrating the UE operation of activating the primary and non-primary sets serving cells

FIG. 14 is a flowchart illustrating the UE operation of activating the primary and non-primary sets serving cells.

The UE receives an A/D MAC CE at step 1405.

The UE determines whether the non-primary set has been configured at step 1407. Depending on the embodiment, the UE may determine whether any serving cell of the non-primary set has been configured. Depending on the embodiment, the UE determines whether any serving cell which is under the control of an eNB which is not the primary eNB (the eNB controlling the PCell of the UE).

If any non-primary set serving cell has been configured, the procedure goes to step 1410 and, otherwise if any non-primary set is not configured or if all serving cells are controlled by one eNB, step 1425.

The UE determines whether the A/D MAC CE is related to the primary set at step 1410. This determination can be made in various methods.

Method 1

If the A/D MAC CE has been received through the primary set serving cell, the A/D MAC CE is related to the primary set and, otherwise if the A/D MAC CE has been received through a non-primary set serving cell, the A/D MAC CE is related to the non-primary set.

Method 2

If the received A/D MAC CE is the first A/D MAC CE, the A/D MAC CE is related to the primary set and, otherwise if the A/D MAC CE is the second A/D MAC CE, the A/D MAC CE is related to the non-primary set.

If the received A/D MAC CE is related to the primary set, the procedure goes to step 1415 and, otherwise if the A/D MAC CE is related to the non-primary set, step 1420.

The UE checks the valid bits among C1 to C7 of the payload of the received A/D MAC CE at step 1415. The UE determines the bits in which the SCell indices match among the SCells configured in the primary set as the valid bits and activates or deactivates the corresponding SCells based on the information of the valid bits. For example, if the SCell 1 and SCell 2 are configured in the primary set, C1 and C2 are valid bits. If a certain SCell x is activated, this means at least one of the following operations is performed.

Monitor PDCCH of SCell x

Start reporting Channel Status Indication (CSI, information downlink channel condition and control information for MIMO operation) for SCell x Start SRS transmission in SCell x Start transmitting Uplink Shared Channel (UL-SCH, data channel carrying uplink signal) in SCell x If a certain SCell x is deactivated, this means stopping at least one of the above operations.

The UE starts or restarts sCellDeactivationTimer of the SCell which is instructed to be activated by the valid bit. The triggered time is transmitted to the primary set serving cell. The sCellDeactivationTimer is the timer for deactivating the SCell automatically if there is not scheduling for the corresponding SCell during a predetermined period.

The sCellDeactivationTimer for the SCell which is instructed to be deactivated by the valid bit may be stopped.

If at least one SCell is activated by the A/D MAC CE, the UE triggers Power Headroom Report (PHR), which is transmitted to the first serving cell to which PHR transmission resource is allocated for new uplink transmission among the primary set serving cells.

The UE checks the valid bits among the C1 to C7 of the payload of the received A/D MAC CE at step 1420. The UE determines the bits in which the SCell indices match among the SCells configured in the non-primary set as the valid bits and activates or deactivates the corresponding SCells based on the information of the valid bits. The UE assumes that the PUCCH SCell in the activated state always and thus ignores the bit corresponding to the PUCCH SCell. For example, if the SCell 3 and SCell 4 are configured in the non-primary set and if the SCell 3 is the PUCCH SCell, the UE determines C3 and C4 as valid bits and activates or deactivates the SCell 4 depending on the value of C4. The UE starts or restarts the sCellDeactivationTimer of the SCell instructed to be activated and stops the sCellDeactivationTimer of the SCell instructed to be deactivated. If at least one SCell is activated by the A/D MAC CE, the UE triggers Power Headroom Report (PHR), which is transmitted through the first serving cell allocated the PHR transmission resource for new uplink transmission among the non-primary set serving cells.

The UE checks the valid bits among the C1 to C7 of the payload of the received A/D MAC CE at step 1425. The UE determines all bits related to the currently configured serving cells as the valid bits and activates or deactivates the corresponding serving cells based on the values of the corresponding bits. If at least one SCell is activated based on the received A/D MAC CE, the UE triggers Power Headroom Report (PHR), which is transmitted to the first serving cell allocated the PHR transmission resource for new uplink transmission among the serving cells.

In an embodiment, the random access in a SCell can be performed only when the corresponding SCell is in the activated state. In the conventional method, the SCells are configured to operate in the deactivated initially and then transition to the activated state when the activation command is received through the A/D MAC CE. If this mechanism is applied to the non-primary set serving cell without modification, the random access delay problem occurs in the non-primary set serving cell.

In an embodiment of the present invention, a certain SCell, e.g. PUCCH SCell, stays in the activated state when a predetermined condition is fulfilled independently of the receipt of the A/D MAC CE.

Figure 15:
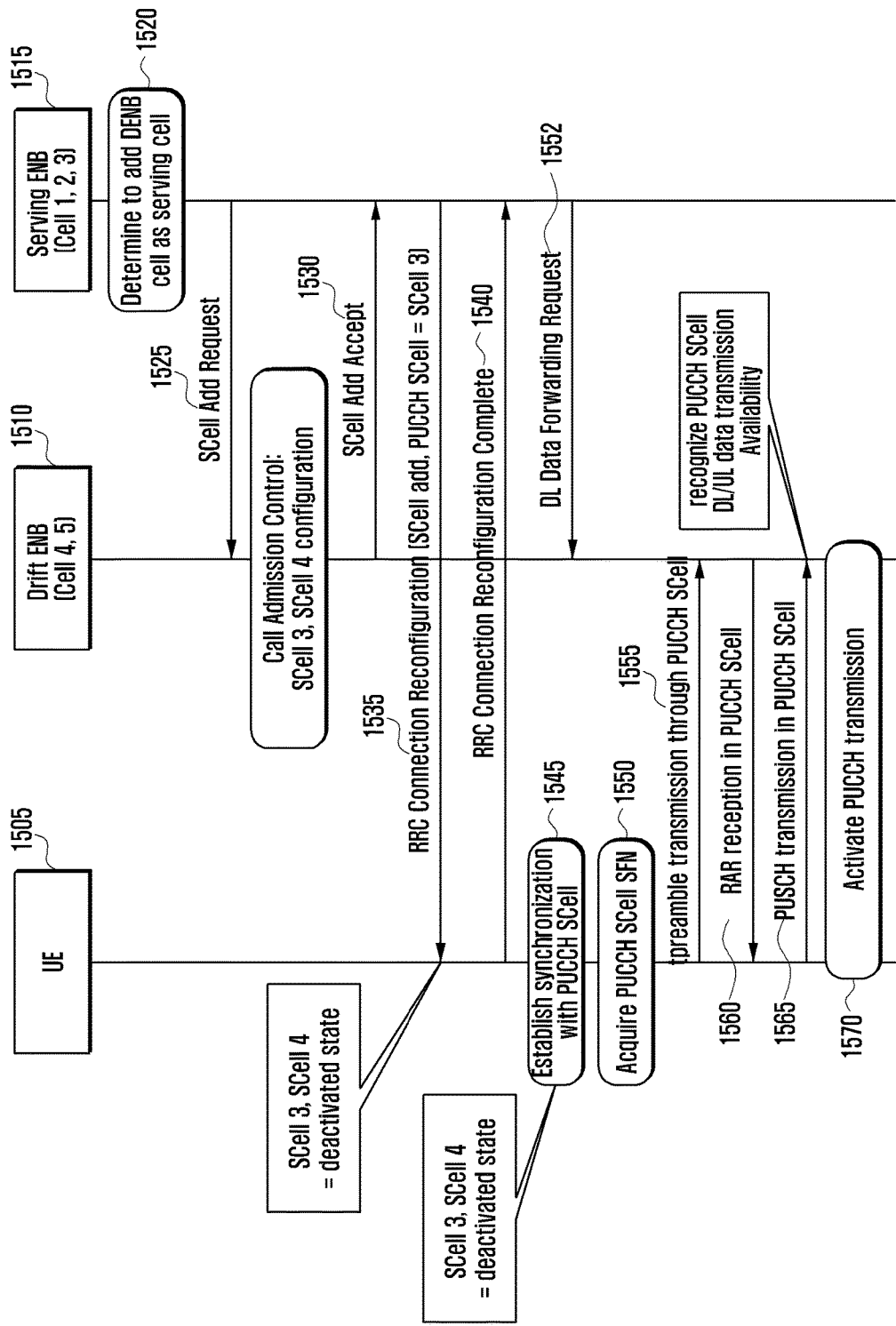
FIG. 15 is a diagram illustrating the PUCCH SCell configuration procedure.

FIG. 15 is a diagram illustrating the PUCCH SCell configuration procedure between the UE and the eNB.

In the description of an embodiment, the drift eNB 1510 may be referred to as eNB 2 1510.

Referring to FIG. 15, the serving eNB 1515 determines to add a SCell to the UE at a certain time point at step 1520.

In this embodiment, if the UE 1505 is located in the area of the cell controlled by the eNB 2 1510, the serving eNB 1515 may determine to add a cell under the control of the eNB 2 1510 as a SCell and send the eNB 2 1510 a control message requesting to add the SCell at step 1525. The control message may include at least one of the informations listed in table 2.

If the SCell add request control message is received at step 1525, the drift eNB 1510 determines whether to accept the request in consideration of at least one of the current load status and channel condition. If it is determined to accept the request, the drift eNB 1510 sends the serving eNB 1515 a control message including at least one of the informations listed in table 3 at step 1530.

If the control message is received, the serving eNB sends the UE 1505 a control message instructing to add the serving cell at step 1535. This control message may be transmitted to the UE 1505 through an RRC control message. The RRC control message includes at least one of the informations listed in table 4. The RRC control message also may include the information on the random access in the PUCCH SCell. If a non-primary set serving cell is configured through this control message, the UE 1505 configures the non-primary set serving cell and sets its initial state to the deactivated.

At step 1540, the UE 1505 sends the serving eNB 1515 a response message in replay to the message received at step 1535.

The UE 1505 establishes downlink synchronization with the newly configured SCells at step 1545. In an embodiment, if the downlink synchronization is established with the PUCCH SCell, the UE 1505 may transition the state of the PUCCH SCell to the activated state.

The UE 1505 acquires System Frame Number (SFN) of the PUCCH SCell among the newly configured SCells at step 1550. In an embodiment, the SFN may be acquired in the procedure of receiving the system information, particularly Master Information Block (MIB). The SFN is an integer and increments by 1 at every 10 ms in the range from 0 to 1023. The UE 1505 checks the PUCCH transmission of PUCCH SCell using the SFN and PUCCH configuration information. When a certain SCell is configured, if the SCell is the PUCCH SCell, the UE receives the MIB to acquire the SFN and, otherwise if the SCell is not the PUCCH SCell, uses the SFN of the PCell or PUCCH SCell without receipt of the SFN.

The serving eNB 1515 sends the drift eNB a downlink data forwarding request at step 1552.

If the above operation has completed, or in parallel with step 1550, the UE transmits a preamble through the PUCCH SCell at step 1555.

After transmitting the preamble, the UE 1505 monitors the PDCCH of the PUCCH SCell during a predetermined period determined in association with the subframe at which the preamble has been transmitted at step 1560. The drift eNB determines whether there is any downlink scheduling information addressed to the RA-RNTI mapped to the time/frequency resource used for transmitting the preamble and, if so, decodes the PDSCH based on the downlink scheduling information. The random access response message received on the PDSCH includes a Random Access Preamble ID matching the preamble transmitted by the UE, the drift eNB determines that the random access response message is the valid response message.

The UE 1505 adjusts the uplink transmission timing by applying the Timing Advance (TA) command included in the response message, generates a MAC PDU based on the uplink grant included in the response message, and performs PUSCH transmission through the PUCCH SCell at step 1565. The MAC PDU may include the C-RNTI-NP of the UE and, if the drift eNB 1510 receives the MAC PDU successfully, it assumes that the UE 1505 is capable of transmitting/receiving uplink/downlink signals in the PUCCH SCell.

If the first random access procedure has completed successfully in the PUCCH SCell, the UE 1505 and the drift eNB 1510 activates PUCCH transmission in the PUCCH SCell at step 1570. That is, the UE transmits CSI and SRS on the PUCCH of the SCell at a predetermined timing. The UE assumes that the uplink data transmission is possible through the PUCCH SCell since when the random access procedure has completed successfully and thus, if an uplink grant is received on the PDCCH, performs uplink transmission based thereon. If the random access has completed successfully, this may mean that the Contention Resolution has completed. The Contention Resolution is specified in 36.321. The drift eNB 1510 may instruct activation of the SCell, with the exception of the PUCCH SCell, using the A/D MAC CE.

Figure 16:
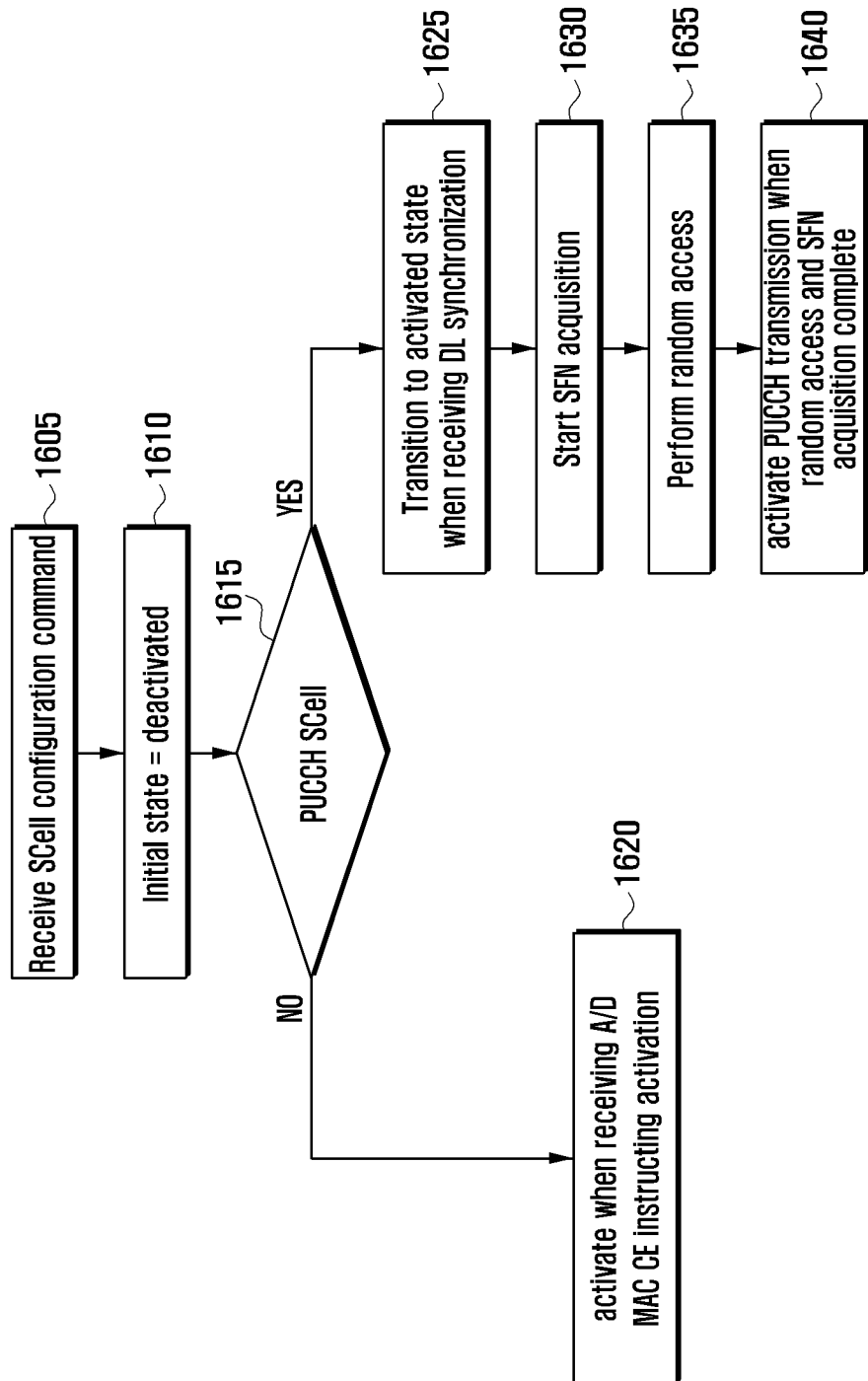
FIG. 16 is a flowchart illustrating the UE operation of configuring and activating the PUCCH SCell.

FIG. 16 is a flowchart illustrating the UE operation of configuring and activating the PUCCH SCell.

Referring to FIG. 16, the UE receives a control message, e.g. RRC connection reconfiguration message, instructing to configure a SCell and configures the SCell at step 1605.

The UE sets the initial state of the SCell to the deactivated state at step 1610.

The UE determines whether the configured SCell is the PUCCH SCell at step 1615. If the configured cell is the PUCCH SCell, the procedure goes to step 1625 and, otherwise, step 1620.

The UE waits for receiving the A/D MAC CE indicating the activated state of the SCell and, upon receipt thereof, activates the SCell at step 1620.

The UE attempts downlink synchronization with the PUCCH SCell and, if the downlink synchronization is acquired, activates the PUCCH SCell at step 1625. If the downlink synchronization with the PUCCH SCell has been established already, the UE sets the state of the PUCCH SCell to the activated state upon receipt of the SCell configuration command. That is, the UE may set the initial state of the PUCCH SCell to the activated state. The UE may activate the PUCCH SCell when the random access is prepared completely or when the random access procedure is triggered.

The UE initiates acquisition of SFN of the PUCCH SCell at step 1630. The UE receives the Master Information Block (MIB) including the SFN information on predetermined time/frequency resource of the PUCCH SCell. The frequency resource may be 6 Resource Blocks (RBs) of the downlink center frequency band. The time resource may be the $n^{th}$ subframe of every radio frame.

The UE performs the SFN random access in the PUCCH SCell along with the SFN acquisition procedure simultaneously at step 1635.

If the random access completes successfully, the UE activates the PUCCH transmission at a predetermined timing at step 1640. The predetermined timing may be the late time point between the random access completion time point and the SFN acquisition time point.

Depending on the embodiment, the eNB may use different activation schemes for the primary set serving cell and the non-primary set serving cell. For example, the primary set SCells are configured initially in the deactivated state while the non-primary set SCell are configured initially in the activated state.

Figure 17:
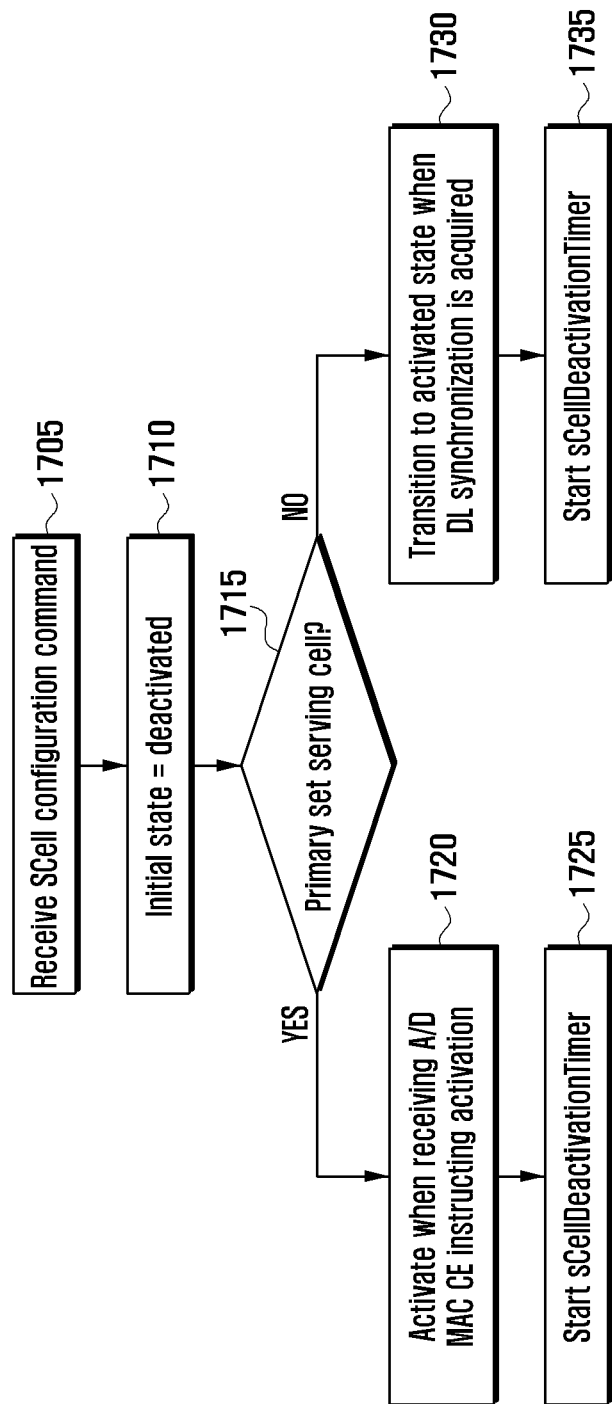
FIG. 17 is a flowchart illustrating the UE operation of configuring and activating the non-primary set serving cells.

FIG. 17 is a flowchart illustrating the UE operation of configuring and activating the non-primary set serving cells.

Referring to FIG. 17, the UE receives a SCell configuration command at step 1705.

The UE configures the SCell initially to be in the deactivated state at step 1710.

The UE determines whether the configured SCell is a primary set serving cell at step 1715. If the configured cell is a primary set serving cell, the procedure goes to step 1720 and, otherwise, step 1730.

The UE waits for receiving the A/D MAC CE and, if the A/D MAC CE instructing activation of the SCell, activates the SCell at step 1720.

The UE starts a sCellDeactivationTimer of the corresponding cell at step 1725. If the A/D MAC CE instructing activation of the SCell is received at sf[n], the sCellDeactivationTimer starts at sf[n+m] where m is an integer, e.g. 8, known to the eNB.

The UE waits for the acquisition of downlink synchronization with the SCell and, if the downlink synchronization is acquired, transitions the state of the SCell to the activated state. If the downlink synchronization has been already established in the SCell configuration phase, the UE may configure the SCell initially in the activated state upon receipt of the SCell configuration command.

The UE starts sCellDeactivationTimer of the cell at a predetermined timing at step 1735. If the control message instructing SCell configuration is received sf[k], the sCellDeactivationTimer starts sf[k+q]. Here, q may be a predetermined integer. The subframe determined by q may be the subframe carrying the response message in replay to the SCell configuration control message.

Figure 18:
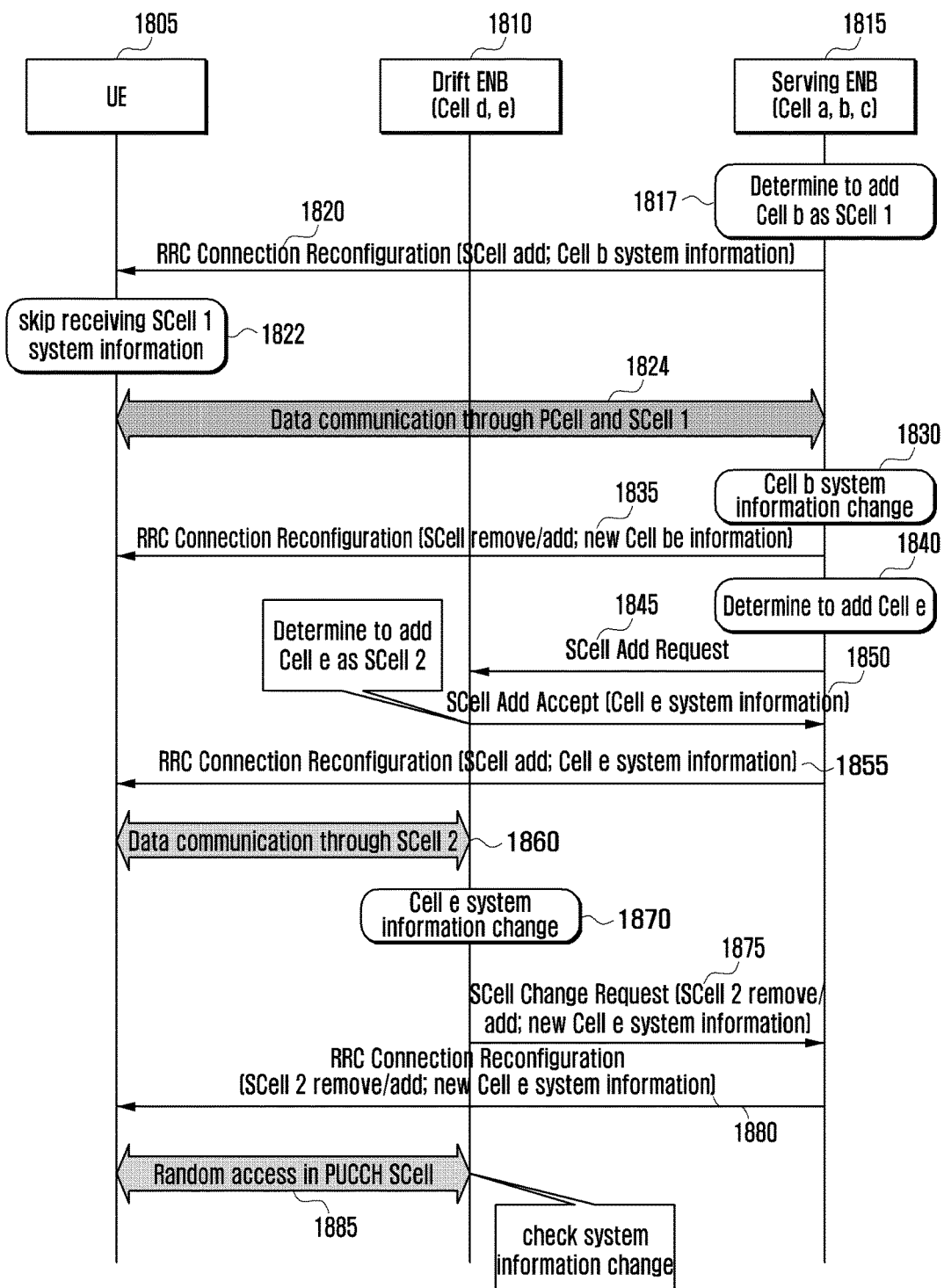
FIG. 18 is a diagram illustrating the procedure of acquiring system information in the primary set and non-primary set serving cell.

FIG. 18 is a diagram illustrating the procedure of adding the primary set and non-primary set serving cell and transmitting/acquiring system information.

Referring to FIG. 18, in the mobile communication system composed of the UE 1801, the first eNB 1 1815, and the second eNB 1810, cells a, b, and c are controlled by the eNB 1, and the cells d and e are controlled by the eNB 2. Under the assumption that cell a is the PCell of the UE, the eNB 1 attempts adding cell b to the UE additionally. In this embodiment, the description is made under the assumption that the eNB 1 1815 is the serving eNB and the eNB 2 1810 is a drift eNB.

The serving eNB 1815 determines to add the cell b as the SCell 1 at step 1817. This decision may be made based on at least one of the channel condition and the traffic of the UE 1805. Depending on the embodiment, the serving cell 1815 may determine the cell to be added as SCell.

The serving eNB 1815 sends the UE 1805 a control message including information related to the SCell to be added to newly to the UE 1805 at step 1820. Depending on the embodiment, the control message may be transmitted through the RRC connection reconfiguration message.

The SCell to be added newly is the cell under the control of the serving cell 1815, and the control message may include at least one of the informations listed in table 1. The radioResourceConfigCommonSCell-r10 includes a part of the system information of the corresponding SCell. For example, it includes at least one of the downlink bandwidth information, downlink HARQ feedback channel configuration information, uplink center frequency information, and uplink bandwidth information that are provided in MIB, SIB1, SIB2 of the SCell. Since the system information of the primary set serving cell is managed by the serving eNB 1815, the eNB can transmit the system information in order for the UE 1805 to operation successfully in the SCell.

It is not necessary for the UE 1805 to acquire the system information from SCell directly and to check the change of the system information at step 1882.

After configuring the SCell, the UE 1805 may receive/transmit downlink/uplink data through the PCell and the SCell 1 at step 1824.

The system information of the cell b changes at a certain time point at step 1830.

The serving eNB 1815 sends the UE 1805 a control message to remove the SCell and perform reconfiguration at step 1835. Depending on the embodiment, the control message may be transmitted through the RRC connection reconfiguration message, and the SCell of which system information has been changed is removed and then reconfigured according to the control message.

In the primary set SCell, the serving eNB 1815 provides the system information using the RRC connection reconfiguration message, and the UE 1805 does not check the change of the system information of the SCell. If the system information of the non-primary set serving cell changes, the drift eNB 1810 requests the serving eNB 1815 to release/configure the serving cell and sends the serving eNB 1815 the changed system information, and the serving eNB 1815 provides the UE 1805 with the changed system information through the serving cell release/configuration procedure.

The serving eNB 1815 determines to add a SCell to the UE 1805 at step 1840. Depending on the embodiment, this determination may be made at an arbitrary time point and, in this embodiment, the cell e is determined to be added. Depending on the embodiment, the SCell add message is transmitted to the drift eNB 1810 without determining the cell to be added such that the drift eNB 1810 determines the SCell.

Particularly if the UE 1805 is located in an area of the cell controlled by the eNB 2 1810, the serving eNB 1815 determines to add a cell controlled by the eNB 2 1810 as the SCell and sends the eNB 2 1810 a control message requesting to add the SCell at step 1845. The control message includes at least one of the informations listed in table 2.

If the SCell add request control message is received, the drift eNB 1810 determines whether to accept the request in consideration of the current load status. If it is determined to add the cell e as the SCell 2, the drift eNB 1810 sends the serving eNB a control message including the information of table 2 at step 1850.

If the control message is received t step 1850, the serving eNB 1815 sends the UE 1805 a control message instructing to add the serving cell at step 1855. The control message may an RRC control message which includes at least one of the informations listed in table 4. The control message includes a part of the system information of the SCell to be added newly, i.e. SCell 2.

The UE 1805 configures the SCell 2 using the information contained in the received RRC connection reconfiguration control message, e.g. system information of the SCell 2, and performs data communication through the SCell 2 at step 1860.

Afterward, the system information of the cell e changes at a certain timing at step 1870.

The drift eNB 1810 sends a control message requesting the serving eNB 1815 to remove and add back the SCell 2 at step 1875. This control message may include new system information of the SCell 2.

The serving eNB 1815 sends the UE 1805 the RRC connection reconfiguration message including the information provided by the drift eNB 1810 at step 1880.

In this embodiment, the UE 1805 removes and then configures the SCell 2 again according to the information included in the control message. At this time, the new system information included in the control message is applied.

The UE 1805 performs random access in the PUCCH SCell to notify of the fact that the new system information has been applied at step 1885. If the random access procedure completes, the drift eNB 1810 assumes that the SCell 2 is configured completely and performs the subsequent operation necessary.

In this present invention, if the non-primary set serving cell is removed and then reconfigured through one RRC control message, i.e. if the serving cell of the same SCell index is removed and then reconfigured with one message, the UE performs random access in the PUCCH SCell, although the non-primary set serving cell is not the PUCCH SCell, to report that the primary set serving cell has been reconfigured successfully.

Figure 19:
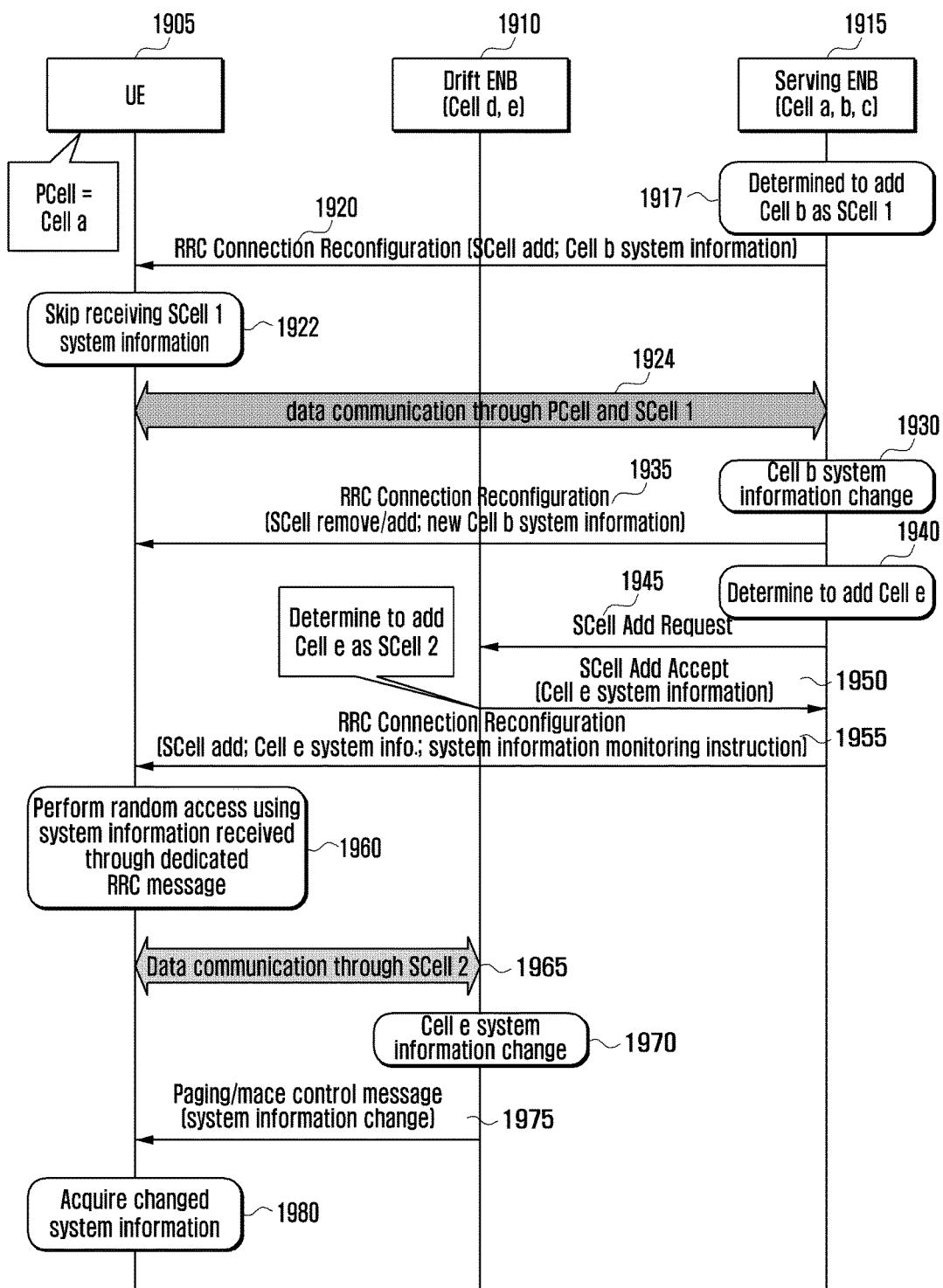
FIG. 19 is a diagram illustrating an alternative procedure of acquiring system information through primary set serving cell and non-primary set serving cell.

A method for the UE to monitor to detect change of the system information in a specific cell among the non-primary set serving cells in order to reduce the delay caused by transmitting the new information provided from the drift eNB to the serving eNB is depicted in FIG. 19.

FIG. 19 is a diagram illustrating an alternative procedure of acquiring system information through primary set serving cell and non-primary set serving cell.

Referring to FIG. 19, steps 1917, 1920, 1922, 1924, 1930, 1935, 1940, 1945, and 1950 may be performed in the same manners as steps 1817, 1820, 1822, 1824, 1830, 1835, 1840, 1845, and 1850.

The serving eNB 1915 sends the UE 1905 a control message instructing to add a serving cell at step 1955. Depending on the embodiment, the serving eNB 1915 may sends the UE 1905 a RRC control message. The RRC control message includes at least one of the informations listed in table 4. The control message includes the information instructing to acquire a part of the system information of the newly added SCell, i.e. SCell 2 and monitor the system information. The information may be transmitted explicitly or analogized from other information. For example, if it is determined in advance for the UE to acquire the system information on the PUCCH SCell (or non-primary set serving cell) and monitor the system information, there is no need of the explicit information provision, and the UE determines whether to perform the system information acquisition/monitoring operation according to whether the SCell is the PUCCH SCell (or non-primary set serving cell) or not.

The UE 1905 configures the SCell 2 using the information included in the RRC connection reconfiguration control message, e.g. system information of SCell 2, and performs the random access procedure with a predetermined SCell at step 1960.

After completing the random access procedure, the UE 1905 communicates data through the SCell at step 1965.

Afterward, the system information of Cell 3 changes at step 1970. Depending on the embodiment, the system information of the Cell e may change at an arbitrary time point.

If the system information of the Cell e changes, the drift eNB 1910 notifies the UE that the system information, particularly MIB, SIB1, and SIB2, has to be received newly in the corresponding SCell at step 1975. The drift eNB 1910 transmits the information on whether the system information has been changed using the paging message or a predetermined dedicated MAC control message. In the case of using the paging message, the UE 1905 monitors the PDCCH of the PUCCH SCell, non-primary set serving cell, or the SCell for which system information acquisition/monitoring has been instructed to detect the downlink scheduling information addressed to P-RNTI. If the downlink scheduling information addressed to the P-RNTI is received, the UE decodes the PDSCH to acquire the paging message based on the scheduling information and determines whether the paging message includes the system information change information.

If the paging message includes the system information change information, the UE 1905 acquires the system information of the corresponding SCell from the start time of the next modification period. The modification period is specified in TS36.331. In the case of using the dedicated RRC control message or MAC CE, the UE decodes the PDSCH using he downlink scheduling information addressed to C-RNTINP and, if the system information change MAC CE or dedicated RRC control message is received on the PDSCH, starts the system information acquisition procedure. The control information includes at least one of the following informations. The system information includes the changed SCell identifier, changed system information type (e.g. indication of the system information changed among MIB, SIB1, and SIB2).

The UE 1905 acquires the system information of the corresponding SCell from the start time of the next modification period.

Figure 20:
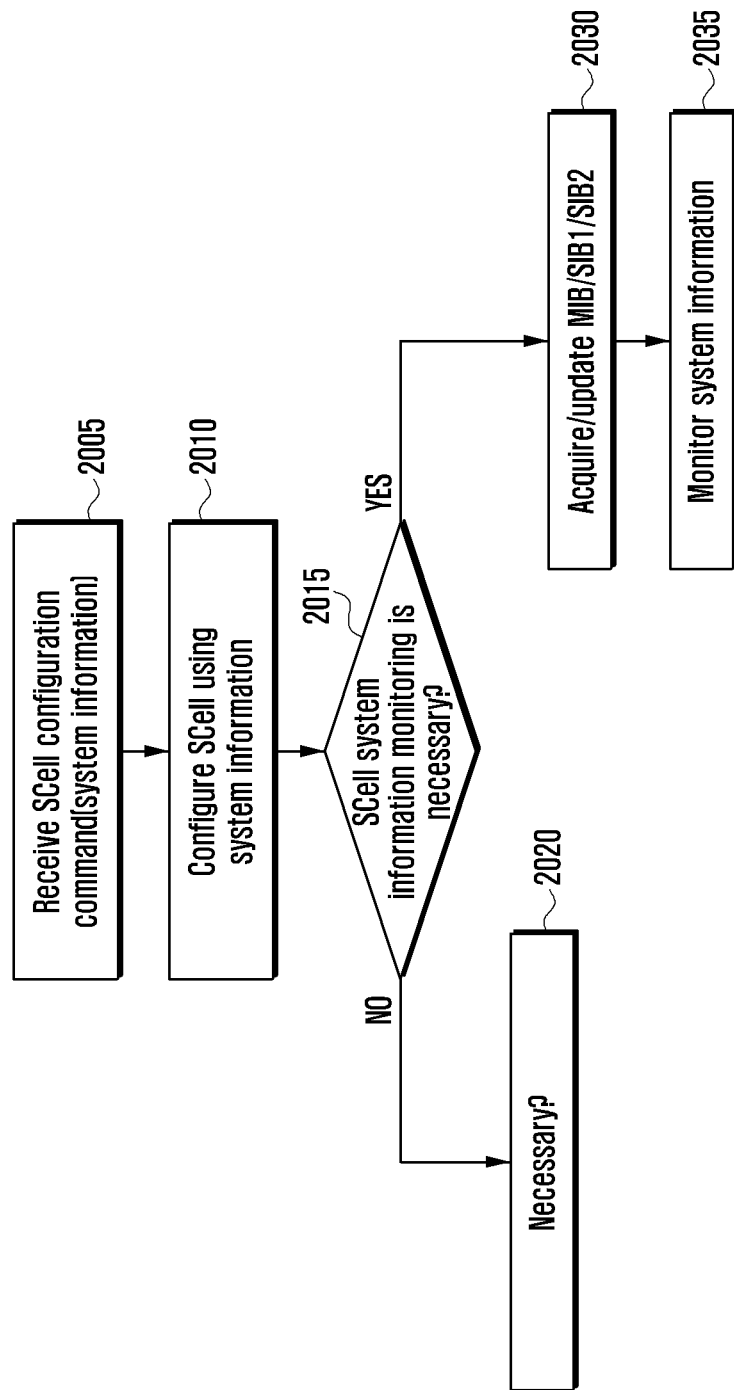
FIG. 20 is a flowchart illustrating the UE operation of acquiring/monitoring system information of the primary set serving cell and non-primary set serving cell.

FIG. 20 is a flowchart illustrating the UE operation of acquiring/monitoring system information of the primary set serving cell and non-primary set serving cell.

Referring to FIG. 20, the UE receives a SCell configuration command at step 2005. The control message includes information on the SCell to be added newly, particularly the partial system information of the SCell such as downlink bandwidth information, downlink HARQ feedback channel configuration information, uplink center frequency information, and uplink bandwidth information.

The UE configures the SCell based on the SCell configuration information such as downlink bandwidth information, and downlink HARQ feedback channel configuration information.

The UE checks whether the SCell is of requiring to acquire and monitor the system information of the configured SCell at step 2015 and, if so, the procedure goes to step 2030 and, otherwise if not, step 2020. For example, if the configured SCell is the PUCCH SCell or non-primary set serving cell or is defined to perform system information acquisition and monitoring in the SCell configuration information, this means that the SCell is of requiring system information acquisition and monitoring and thus the procedure goes to step 2030.

At step 2020, the UE performs data communication without acquiring or monitoring the system information.

At step 2030, the UE acquires the MIB/SIB1/SIB2 of the SCell and updates the information of the same type as the information acquired at step 2005 (e.g. downlink bandwidth information) selectively among the informations included in the system information.

The UE monitors the system information to detect any change thereof at step 2035. Although not shown in the drawing, the UE may perform data communication in the course of steps 2030 and 2035. The UE operation of monitoring the system information to detect change thereof has been described with reference to steps 1975 and 1980 of FIG. 19.

Figure 21:
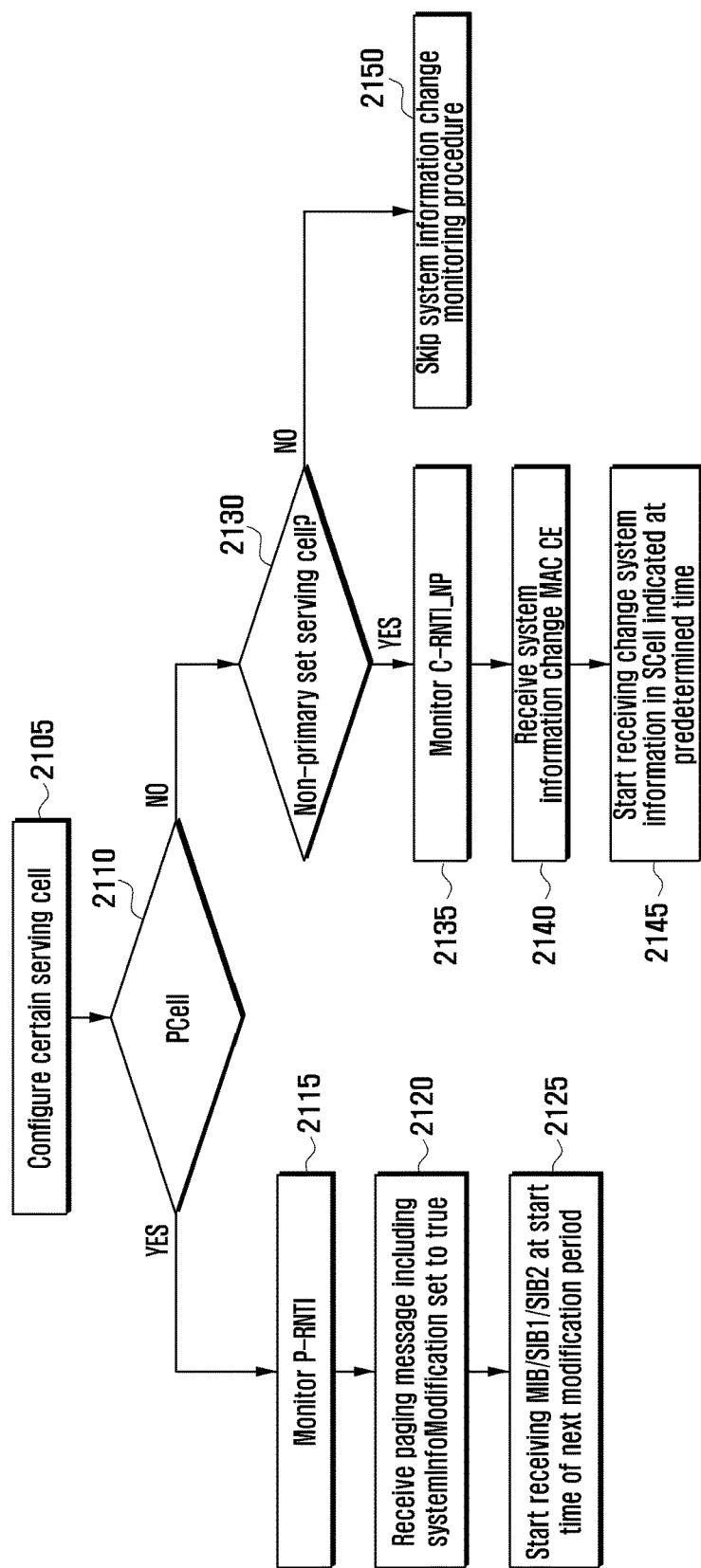
FIG. 21 is a flowchart illustrating an alternative UE operation of monitoring the system information change in association with the primary set serving cell and non-primary set serving cell.

FIG. 21 is a flowchart illustrating the UE operation of monitoring the system information to detect any change thereof in association with the primary set serving cell and non-primary set serving cell.

Referring to FIG. 21, if a certain serving cell is configured at step 2105, the procedure goes to step 2110.

If the configured serving cell is the PCell at step 2110, the procedure goes to step 2115 and, otherwise, step 2130.

At step 2115, the UE monitors P-RNTI.

The UE receives the MAC PDU, i.e. paging message, addressed to the P-RNTI, at step 2120 and, if the paging message includes systemInfoModification set to True, starts receiving MIB/SIB1/SIB2 at the start time of next modification period at step 2125.

At step 2130, the UE determines whether the configured serving cell is a non-primary set serving cell. Or PUCCH SCell. Or SCell for which system information change monitoring is instructed. If so, the procedure goes to step 2135 and, otherwise, step 2150.

At step 2135, the UE monitors C-RNTI NP.

The UE receives a system information change MAC CE at step 2140.

If the system information change MAC CE is received, the procedure goes to step 2145. The system information change MAC CE is identified by a predetermined LCID and may include the information informing which system information of which SCell has been changed.

At step 2145, the UE receives the system information of the SCell of which the MAC CE indicates the system information has been changed at a predetermined time point. The predetermined time point may be the start time of the next modification period of the corresponding SCell or the time elapsed a predetermined period since the time when the system information change MAC CE has been received successfully.

The UE skips the system information change monitoring procedure for the corresponding SCell at step 2150.

A SCell may be added or removed according to the necessity of the drift eNB. At this time, if the UE notifies the drift eNB whether configuration has completed or not immediately, it is possible to avoid performance degradation caused by configuration delay.

Figure 22:
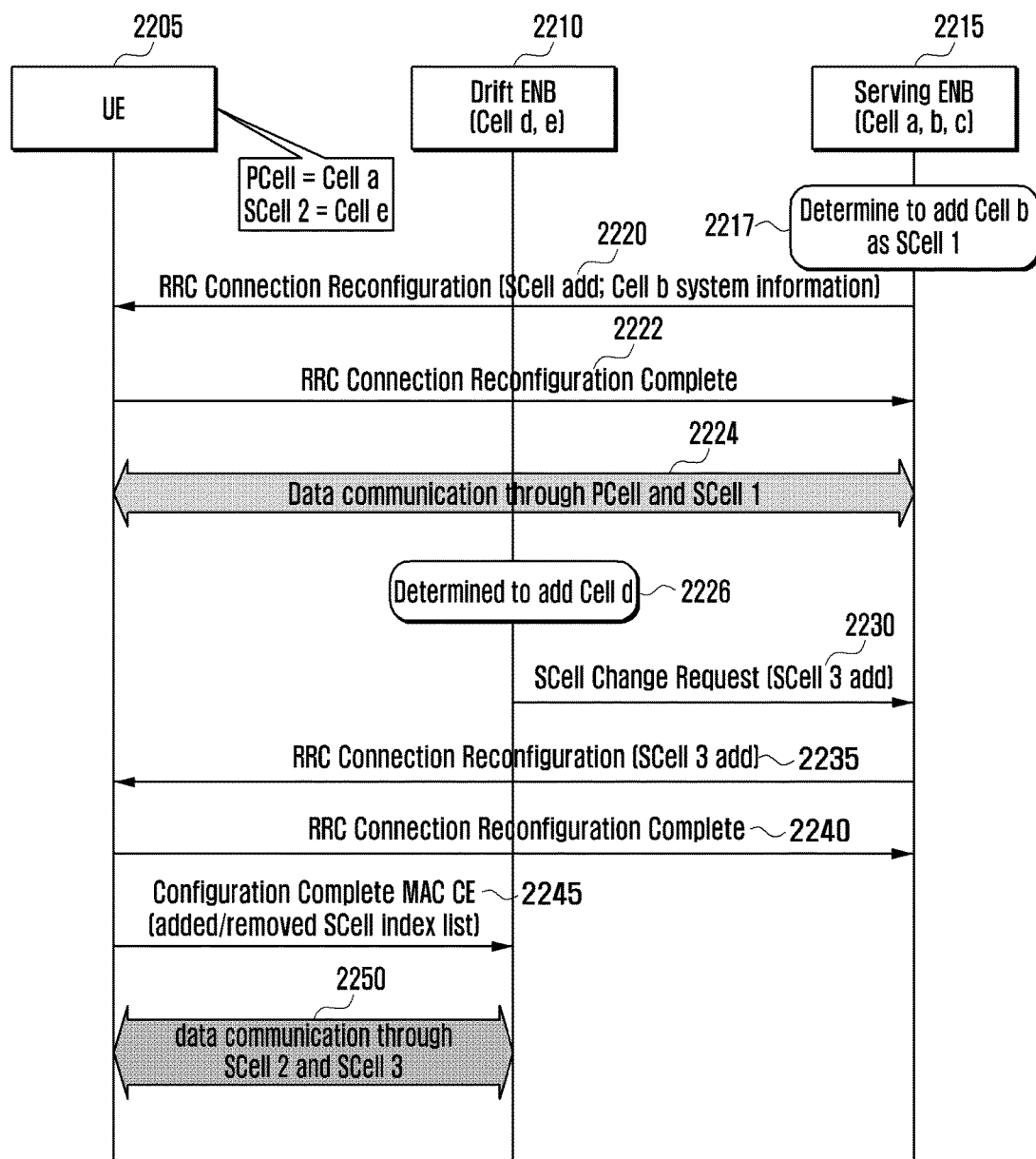
FIG. 22 is a diagram illustrating a procedure of adding primary set and non-primary set serving cells using the configuration complete MAC CE.

FIG. 22 is a diagram illustrating entire operation of adding primary set and non-primary set serving cells and transmitting/acquiring system information.

Referring to FIG. 22, in the mobile communication system composed of the UE 2205, the first eNB 1 2215, and the eNB 2 2210, cells a, b, and c are controlled by the eNB 1, cells d and e are controlled by the eNB 2. In this embodiment, the eNB 1 2215 is referred to as serving eNB, and the eNB 2 2210 is referred to as drift eNB.

The cell a is the PCell of the UE 2205, and the cell e is the SCell 2.

The eNB 1 2215 intends to configure a primary set serving cell, i.e. the cell b, as an additional SCell to the UE 2205 at step 2217.

The serving eNB 2215 sends the UE 2205 a message including the information on the SCell to be added newly at step 2220. This message may be transmitted through a control message called RRC connection reconfiguration. The SCell to be added newly is a cell managed by the serving cell directly, and the control message includes at least one of the informations listed in table 1 per serving cell.

The UE 2205 configures the cell b as SCell 1 according to the configuration information and sends the serving eNB 2215 an RRC connection reconfiguration complete control message at step 2222.

The serving eNB 2215 and the UE 2205 perform data communication through the PCell and SCell 1 at step 2224.

The drift eNB 2210 determines to configure the cell d as an additional SCell to the UE 2205 at step 2226.

The drift eNB 2210 sends the serving eNB 2215 a control message requesting to configure the cell d as SCell 3 at step 2230.

The serving eNB 2215 sends the UE 2205 the RRC connection reconfiguration message including the information provided by the drift eNB 2210 at step 2235. The UE 2205 adds the SCell 3 according to the information included in the control message.

The UE 2205 sends the serving eNB 2215 an RRC connection reconfiguration complete control message at step 2240. If it is recognized that the eNB which has transmitted the complete control message differs from the eNB of which the new serving cell has been configured, the UE 2205 sends the drift eNB 2210 a configuration complete MAC CE at step 2245. The configuration complete MAC CE may be identified by a predetermined LCID and include the identifiers of the SCells added newly or removed. Or it may include the information about completed configuration such as new SCell addition, old SCell removal, old SCell modification, PUCCH transmission reconfiguration, and radio transmission resource configuration.

If the MAC CE is received, the drift eNB 2210 starts data communication through the newly configured SCell at step 2250. In an embodiment, steps 2240 and 2245 may be in different temporal order. The UE 2205 may perform step 2245 prior to step 2240, i.e. transmit the configuration complete MAC CE to the drift eNB 2210 before transmitting the RRC connection reconfiguration complete control message so as to start data communication more promptly.

Figure 23:
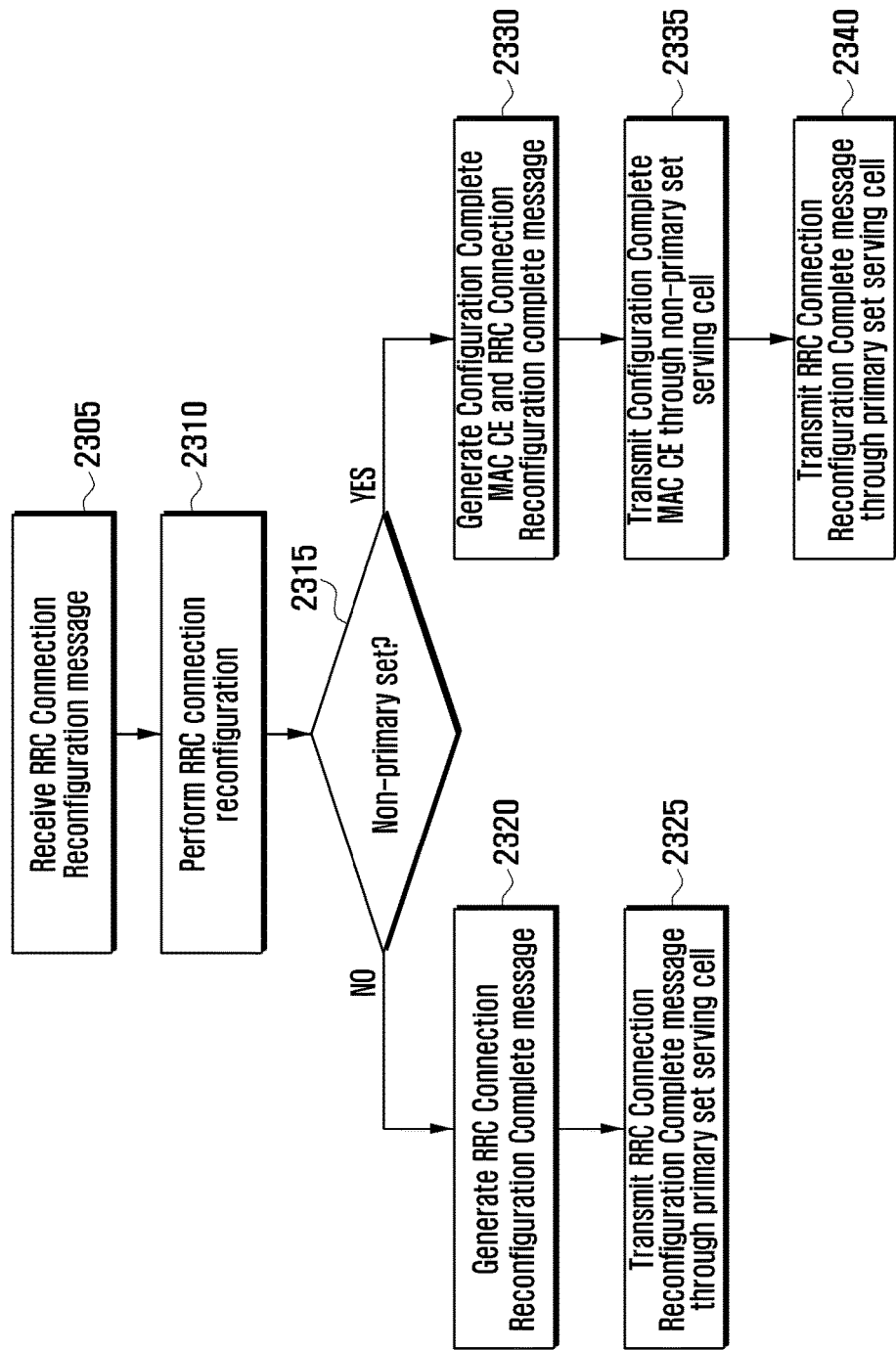
FIG. 23 is a flowchart illustrating the UE operation which has received the RRC connection reconfiguration message in the primary set serving cell and non-primary set serving cell.

FIG. 23 is a flowchart illustrating the UE operation which has received the RRC connection reconfiguration message in the primary set serving cell and non-primary set serving cell.

Referring to FIG. 23, the UE receives a RRC connection reconfiguration message at step 2305.

The UE performs RRC configuration reconfiguration based on the received RRC connection reconfiguration message at step 2310. In this embodiment, the RRC connection reconfiguration means the operation of reconfiguring the radio transmission resource PUCCH transmission resource or layer 2 configuration of a specific serving cell, new SCell addition, old SCell removal, or old SCell modification.

The UE determines whether the RRC connection reconfiguration is associated with a non-primary set at step 2315 and, if so, the procedure goes to step 2330 and, otherwise, step 2320. If RRC connection reconfiguration fulfils at least one of the following conditions, the reconfiguration is associated with the non-primary set.

The RRC connection reconfiguration is of adding, removing, or modify an SCell which is not a primary set serving cell The RRC connection reconfiguration is of configuring, releasing, or modifying PUCCH transmission in PUCCH SCell The RRC connection reconfiguration is of configuring, releasing, or modifying SRS transmission in the SCell which is not a primary set serving cell The RRC connection reconfiguration is of configuring MAC associated with non-primary set, e.g. modifying DRX configuration of non-primary set The RRC connection reconfiguration is of modifying configuration of non-primary set logical channel The UE generates an RRC connection reconfiguration complete message at step 2320 and transmits this message to the primary set serving cell at step 2325 to complete the procedure.

The UE generates a configuration complete MAC CE and RRC connection reconfiguration complete message at step 2330.

The UE sends the non-primary set serving cell the configuration complete MAC CE at step 2335.

The UE sends the primary set serving cell the RRC connection reconfiguration complete message at step 2340 to complete the procedure.

Figure 24:
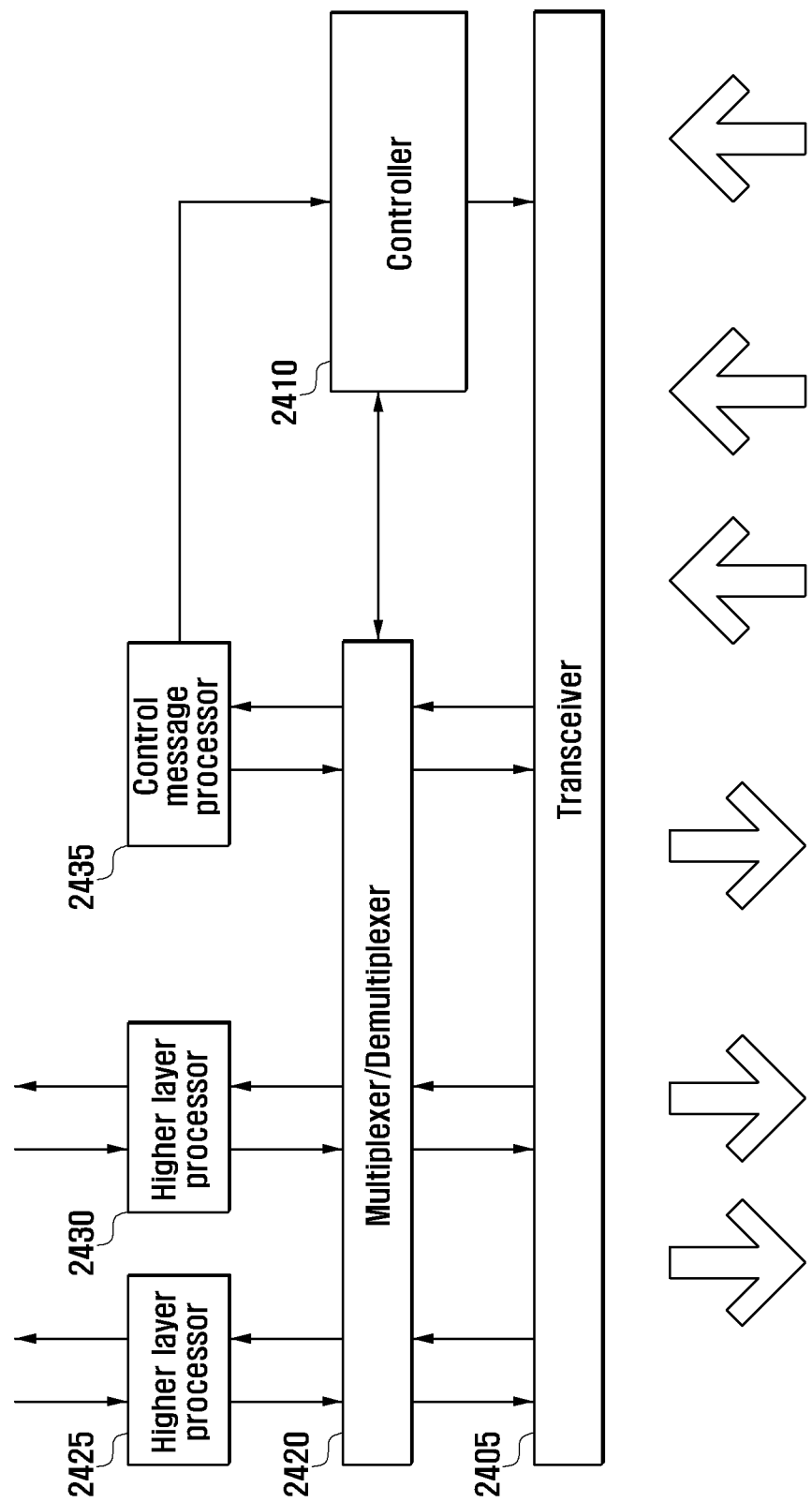
FIG. 24 is a block diagram illustrating the UE.

FIG. 24 is a block diagram illustrating a configuration of the UE according to an embodiment of the present invention.

Referring to FIG. 24, the UE according to an embodiment of the present invention includes a transceiver 2405, a controller 2410, a multiplexer/demultiplexer 2420, a control message processor 2435, and various higher layer processors 2425 and 2430.

The transceiver 2405 receives data and predetermined control signals on the downlink channel of the serving cell and transmits data and predetermined control signals on the uplink channel. In the case that a plurality of serving cells is configured, the transceiver 2405 transmits/receives data and control signals through the plural serving cells.

The multiplexer/demultiplexer 2420 multiplexes the data generated by the higher layer processors 2425 and 2430 and the control message processor 2435 and demultiplexes the data received by the transceiver 2405, the demultiplexed data being delivered to the higher layer processors 2425 and 2430 or the control message processor 2435.

The control message processor 2435 is an RRC layer entity which takes an action necessary for processing the control message received from the eNB. For example, the control message processor 2435 processes the received random access-related information and delivers the processing result to the controller.

The higher layer processors 2425 and 2430 are established per service. The higher layer processor processes the data generated by the user service such as File Transfer Protocol (FTP) and Voice over Internet Protocol (VoIP), the processing result being delivered to the multiplexer/demultiplexer 2420, and processes the data from the multiplexer/demultiplexer 2415, the processing result being delivered to the higher layer service application.

The controller 2410 controls the transceiver 2405 and the multiplexer/demultiplexer 2420 to perform uplink transmission using appropriate resource at an appropriate timing based on the scheduling command, e.g. uplink grants, received by the transceiver 2405. The controller controls overall procedures associated with SCell configuration and DRX operation. In more detail, the controller controls overall operations of the UE AS described with reference to FIGS. 5 to 23.

Figure 25:
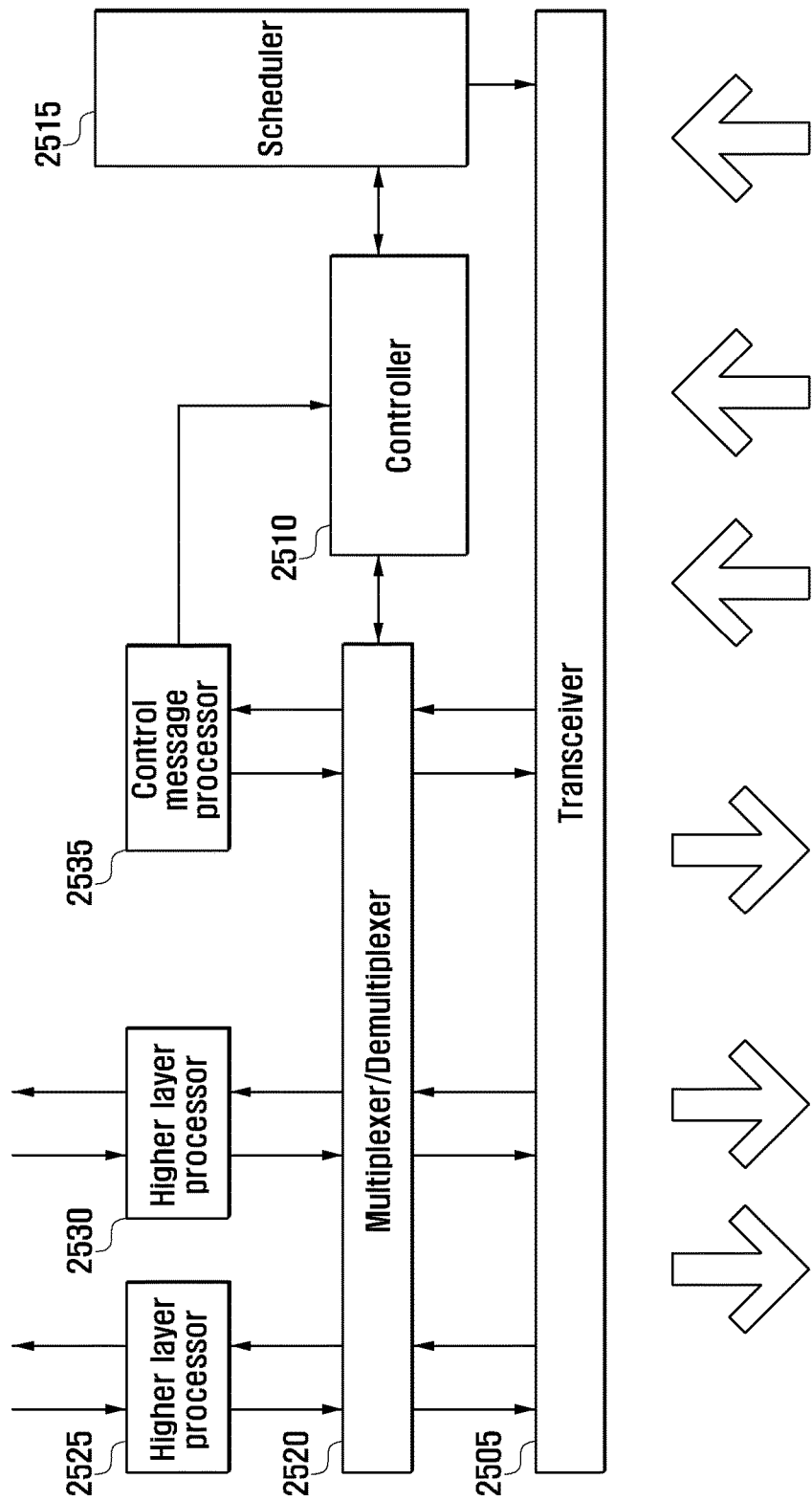
FIG. 25 is a block diagram illustrating the eNB

FIG. 25 is a block diagram illustrating an eNB according to an embodiment of the present invention.

Referring to FIG. 25, the eNB includes a transceiver 2505, a controller 2510, a multiplexer/demultiplexer 2520, a control message processor 2535, various higher layer processors 2525 and 2530, and a scheduler 2515.

The transceiver transmits data and predetermined control signals on the downlink channel of the serving cell and receives data and predetermined control signals on the uplink channel. In the case that a plurality of carriers is configured, the transceiver 2505 transmits/receives data and control signals through the plural carriers.

The multiplexer/demultiplexer 2520 is responsible for multiplexing data generated by the higher layer processors 2525 and 2530 and the control message processor 2535 or demultiplexing the data received by the transceiver 2505, the demultiplexed data being delivered to the control message processor 2535 or the controller 2510. The control message processor 2535 processes the control message transmitted by the UE and takes a necessary action or generates a control message to be transmitted to the UE, the generated control message being delivered to the lower layer.

The higher layer processors 2525 and 2530 are established per service and processes the data from the S-GW or other eNB into RLC PDU, the RLC PDU being delivered to the multiplexer/demultiplexer 2520, and processes the RLC PDU from the multiplexer/demultiplexer 2520 into PDCP SDU, the PDCP SDU being transmitted to the S-GW or other eNB.

The scheduler allocates transmission resource to the UE at an appropriate timing in consideration of the UE buffer status and channel status and controls the transceiver to process the signal to be transmitted to the UE and transmit the signal.

The controller controls overall operations associated with the random access and SR transmission. In more detail, the controller performs control operations of the eNB as described with reference to FIGS. 5 to 23.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing the broader spirit and scope of the invention.

What is claimed is:

1. A method by a terminal in a communication system, the method comprising:
    receiving first control information for a secondary cell group on a primary cell group, the first control information including information for at least one serving cell of the secondary cell group;
    acquiring master information block (MIB) on a first serving cell of the secondary cell group, a physical uplink control channel (PUCCH) being configured in the first serving cell;
    identifying system frame number (SFN) for the at least one serving cell of the secondary cell group based on the acquired MIB; and
    transmitting uplink control information on the first serving cell of the secondary cell group based on the identified SFN,
    wherein the at least one serving cell of the secondary cell group except for the first serving cell is in deactivated state in response to the first control information.

2. The method of claim 1, further comprising:
    identifying synchronization information for downlink of the first serving cell of the secondary cell group in response to the first control information.

3. The method of claim 1, wherein the uplink control information includes at least one of a channel quality reporting, scheduling request configuration and sounding reference signal configuration.

4. The method of claim 1, wherein the uplink control information is transmitted in response to a procedure of a random access associated with the first serving cell of the secondary cell group.

5. A method by a base station in a communication system, the method comprising:
    transmitting first control information for a secondary cell group on a primary cell group, the first control information including information for at least one serving cell of the secondary cell group;
    transmitting master information block (MIB) on a first serving cell of the secondary cell group, a physical uplink control channel (PUCCH) being configured in the first serving cell; and
    receiving uplink control information on the first serving cell of the secondary cell group based on system frame number (SFN) identified based on the MIB, the SFN being identified for the at least one serving cell of the secondary cell group,
    wherein the at least one serving cell of the secondary cell group except for the first serving cell is in deactivated state in response to the first control information.

6. The method of claim 5, wherein synchronization information for downlink of first serving cell of the secondary cell group is identified in response to the first control information.

7. The method of claim 5, wherein the uplink control information includes at least one of a channel quality reporting, scheduling request configuration and sounding reference signal configuration.

8. The method of claim 5, wherein the uplink control information is received in response to a procedure of a random access associated with the first serving cell of the secondary cell group.

9. A terminal in a communication system, the terminal comprising:
a transceiver; and
at least one processor coupled with the transceiver and configured to control to:
receive first control information for a secondary cell group on a primary cell group, the first control information including information for at least one serving cell of the secondary cell group;
acquire master information block (MIB) on a first serving cell of the secondary cell group, a physical uplink control channel (PUCCH) being configured in the first serving cell;
identify system frame number (SFN) for the at least one serving cell of associated with the secondary cell group based on the acquired MIB; and
transmit uplink control information on the first serving cell of the secondary cell group based on the identified SFN,
wherein the at least one serving cell of the secondary cell group except for the first serving cell is in deactivated state in response to the first control information.

10. The terminal of claim 9, wherein the at least one processor is further configured to identify synchronization information for downlink of the first serving cell of the secondary cell group in response to the first control information.

11. The terminal of claim 9, wherein the uplink control information includes at least one of a channel quality reporting, scheduling request configuration and sounding reference signal configuration.

12. The terminal of claim 9, wherein the uplink control information is transmitted in response to a procedure of a random access associated with the first serving cell of the secondary cell group.

13. A base station in a communication system, the base station comprising:
a transceiver; and
at least one processor coupled with the transceiver and configured to control to:
transmit first control information for a secondary cell group on a primary cell group, the first control information including information for at least one serving cell of the secondary cell group;
transmit master information block (MIB) on a first serving cell of the secondary cell group, a physical uplink control channel (PUCCH) being configured in the first serving cell; and
receive uplink control information on the first serving cell of the secondary cell group based on system frame number (SFN) identified based on the MIB, the SFN being identified for the at least one serving cell of the secondary cell group,
wherein the at least one serving cell of the secondary cell group except for the first serving cell is in deactivated state in response to the first control information.

14. The base station of claim 13, wherein synchronization information for downlink of the first serving cell of the secondary cell group is identified in response to the first control information.

15. The base station of claim 13, wherein the uplink control information includes at least one of a channel quality reporting, scheduling request configuration and sounding reference signal configuration.

16. The base station of claim 13, wherein the uplink control information is received in response to a procedure of a random access associated with the first serving cell of the secondary cell group.

* * * * *